US010311243B2

(12) United States Patent
Calmon et al.

(10) Patent No.: US 10,311,243 B2
(45) Date of Patent: Jun. 4, 2019

(54) METHOD AND APPARATUS FOR SECURE COMMUNICATION

(71) Applicants: Massachusetts Institute of Technology, Cambridge, MA (US); National University of Ireland Maynooth, Maynooth (IE)

(72) Inventors: Flavio du Pin Calmon, White Plains, NY (US); Muriel Medard, Belmont, MA (US); Linda M. Zeger, Lexington, MA (US); Mark M. Christiansen, Dublin (IE); Kenneth R. Duffy, Dublin (IE)

(73) Assignees: Massachusetts Institute of Technology, Cambridge, MA (US); National University of Ireland Maynooth, Maynooth (IE)

( * ) Notice: Subject to any disclaimer, the term of this patent is extended or adjusted under 35 U.S.C. 154(b) by 177 days.

(21) Appl. No.: 14/208,683

(22) Filed: Mar. 13, 2014

(65) Prior Publication Data

US 2016/0154970 A1 Jun. 2, 2016
US 2018/0046815 A9 Feb. 15, 2018

Related U.S. Application Data

(60) Provisional application No. 61/783,708, filed on Mar. 14, 2013, provisional application No. 61/783,747, filed on Mar. 14, 2013.

(51) Int. Cl.

| | |
|---|---|
| ***G06F 21/62*** | (2013.01) |
| ***H04L 29/06*** | (2006.01) |

(Continued)

(52) U.S. Cl.
CPC .......... *G06F 21/6209* (2013.01); *H04L 9/065* (2013.01); *H04L 63/0435* (2013.01); (Continued)

(58) Field of Classification Search
CPC . H04L 63/0435; H04L 9/065; H04L 2209/30; H04L 2209/34; G06F 21/6209; H04M 13/1102; H04M 13/1515
(Continued)

(56) References Cited

U.S. PATENT DOCUMENTS 5,285,497 A * 2/1994 Thatcher, Jr. ........... G06T 9/005 348/425.2
5,577,056 A 11/1996 Malik et al.
(Continued)

FOREIGN PATENT DOCUMENTS

EP 1 638 239 A1 3/2006
WO WO 2007/109216 A1 9/2007
(Continued)

OTHER PUBLICATIONS

T.871 : Information technology—Digital compression and coding of continuous-tone still images: JPEG File Interchange Format (JFIF), May 2011, 18 Pages.*
(Continued)

*Primary Examiner* — Matthew T Henning
(74) *Attorney, Agent, or Firm* — Daly, Crowley, Mofford & Durkee, LLP

(57) ABSTRACT

Secrecy scheme systems and associated methods using list source codes for enabling secure communications in communications networks are provided herein. Additionally, improved information-theoretic metrics for characterizing and optimizing said secrecy scheme systems and associated methods are provided herein. One method of secure communication comprises receiving a data file at a first location, encoding the data file using a list source code to generate an encoded file, encrypting a select portion of the data file using a key to generate an encrypted file, and transmitting the encoded file and the encrypted file to an end user at a
(Continued)

destination location, wherein the encoded file cannot be decoded at the destination location until the encrypted file has been received and decrypted by the end user, wherein the end user possesses the key.

23 Claims, 7 Drawing Sheets

(51) Int. Cl.
*H04L 9/06* (2006.01)
*H03M 13/11* (2006.01)
*H03M 13/15* (2006.01)

(52) U.S. Cl.
CPC .... *H03M 13/1102* (2013.01); *H03M 13/1515* (2013.01); *H04L 2209/30* (2013.01); *H04L 2209/34* (2013.01)

(58) Field of Classification Search
USPC .......................................................... 713/165
See application file for complete search history.

(56) References Cited

U.S. PATENT DOCUMENTS 6,128,773 A 10/2000 Snider
6,621,851 B1 9/2003 Agee et al.
6,823,068 B1 * 11/2004 Samid .................. H04L 9/0838 380/277
6,885,653 B2 4/2005 Choi et al.
7,064,489 B2 6/2006 Price
7,071,853 B2 7/2006 Price
7,095,343 B2 8/2006 Xie et al.
7,164,691 B2 1/2007 Knapp et al.
7,283,564 B2 10/2007 Knapp et al.
7,349,440 B1 3/2008 Chou et al.
7,408,938 B1 8/2008 Chou et al.
7,414,978 B2 8/2008 Lun et al.
7,529,198 B2 5/2009 Jain et al.
7,706,365 B2 4/2010 Effros et al.
7,760,728 B2 7/2010 Chou et al.
7,821,980 B2 10/2010 Chakrabarti et al.
7,876,677 B2 1/2011 Cheshire
7,912,003 B2 3/2011 Radunovic et al.
7,945,842 B2 5/2011 He
8,040,836 B2 10/2011 Wu et al.
8,068,426 B2 11/2011 Sundararajan et al.
8,130,776 B1 3/2012 Sundararajan et al.
8,279,781 B2 10/2012 Lucani et al.
8,451,756 B2 5/2013 Lucani et al.
8,482,441 B2 7/2013 Medard et al.
8,504,504 B2 8/2013 Liu
8,571,214 B2 10/2013 Lima et al.
8,935,527 B2 * 1/2015 Francillon ............. H03M 13/03 713/168
2002/0018565 A1 * 2/2002 Luttrell ................ H04N 7/1675 380/217
2002/0141590 A1 10/2002 Montgomery
2003/0055614 A1 3/2003 Pelikan
2003/0159140 A1 8/2003 Candelore
2003/0214951 A1 11/2003 Joshi et al.
2004/0037421 A1 * 2/2004 Truman ............... H04N 7/1675 380/200
2004/0120517 A1 * 6/2004 Inomata .................. G06T 9/005 380/28
2004/0123094 A1 6/2004 Sprunk
2004/0203752 A1 10/2004 Wojaczynski et al.
2005/0010675 A1 1/2005 Jaggi et al.
2005/0039037 A1 * 2/2005 Sakoh ............... H04L 29/06027 713/193
2005/0078653 A1 4/2005 Agashe et al.
2005/0152391 A1 7/2005 Effros et al.
2005/0251721 A1 11/2005 Ramesh et al.
2006/0020560 A1 1/2006 Rodriguez et al.
2006/0021007 A1 * 1/2006 Rensin .................. G06F 21/313 726/2
2006/0146791 A1 7/2006 Deb et al.
2006/0171534 A1 * 8/2006 Baughman ............ H04L 9/0618 380/47
2006/0224760 A1 10/2006 Yu et al.
2006/0247952 A1 11/2006 Muraca
2007/0046686 A1 3/2007 Keller
2007/0116027 A1 5/2007 Ciavaglia et al.
2007/0274324 A1 11/2007 Wu et al.
2008/0043676 A1 2/2008 Mousseau et al.
2008/0049746 A1 2/2008 Morrill et al.
2008/0123579 A1 5/2008 Kozat et al.
2008/0126910 A1 * 5/2008 Venkatesan ....... H03M 13/3746 714/758
2008/0259796 A1 10/2008 Abousleman et al.
2008/0279281 A1 * 11/2008 Draper ................... H03M 7/30 375/240.22
2008/0291834 A1 11/2008 Chou et al.
2008/0301775 A1 * 12/2008 Ollikainen .......... G06F 21/6272 726/3
2008/0320363 A1 12/2008 He
2009/0003216 A1 1/2009 Radunovic et al.
2009/0086977 A1 4/2009 Berggren
2009/0135717 A1 5/2009 Kamal et al.
2009/0153576 A1 6/2009 Keller
2009/0169001 A1 * 7/2009 Tighe ........................ H04L 9/34 380/217
2009/0175320 A1 7/2009 Haustein et al.
2009/0198829 A1 8/2009 Sengupta et al.
2009/0207930 A1 8/2009 Sirkeci et al.
2009/0238097 A1 9/2009 Le Bars et al.
2009/0248898 A1 10/2009 Gkantsidis et al.
2009/0285148 A1 11/2009 Luo et al.
2009/0310582 A1 12/2009 Beser
2009/0313459 A1 12/2009 Horvath
2009/0316763 A1 12/2009 Erkip et al.
2010/0014669 A1 1/2010 Jiang
2010/0046371 A1 2/2010 Sundararajan et al.
2010/0057636 A1 3/2010 Brennan
2010/0111165 A1 5/2010 Kim et al.
2010/0146357 A1 6/2010 Larsson
2010/0295710 A1 11/2010 Xu et al.
2011/0035642 A1 * 2/2011 Francillon ............. H03M 13/03 714/752
2011/0103587 A1 * 5/2011 Oda ...................... H04L 9/0894 380/277
2011/0181604 A1 * 7/2011 Lee ......................... G06F 3/041 345/473
2011/0238855 A1 9/2011 Korsunsky et al.
2011/0243470 A1 10/2011 Noguchi
2012/0218891 A1 8/2012 Sundararajan et al.
2012/0300692 A1 11/2012 Sfar et al.
2013/0027230 A1 * 1/2013 Marpe ................. H03M 7/4006 341/107
2013/0107764 A1 5/2013 Zeger et al.
2013/0114481 A1 5/2013 Kim et al.
2013/0114611 A1 5/2013 Zeger et al.
2013/0195106 A1 8/2013 Calmon et al.
2014/0064296 A1 3/2014 Haeupler et al.
2014/0185803 A1 7/2014 Lima et al.
2014/0268398 A1 9/2014 Medard et al.
2014/0269485 A1 9/2014 Medard et al.
2014/0269503 A1 9/2014 Medard et al.
2014/0269505 A1 9/2014 Medard et al.
2014/0280395 A1 9/2014 Medard et al.
2014/0280454 A1 9/2014 Medard et al.

FOREIGN PATENT DOCUMENTS

WO WO 2010/005181 A2 1/2010
WO WO 2010/005181 A3 1/2010
WO WO 2010/025362 A2 3/2010
WO WO 2011/043754 A1 4/2011
WO WO 2011/119909 A1 9/2011
WO WO 2012/167034 A2 12/2012
WO WO 2013/006697 A2 1/2013
WO WO 2013/067488 A1 5/2013

(56) References Cited

FOREIGN PATENT DOCUMENTS

WO WO 2013/116456 A1 8/2013
WO WO 2014/159570 A1 10/2014
WO WO 2014/160194 A3 10/2014

OTHER PUBLICATIONS

Byers et al. "Securing bulk content almost for free", Computer Communications, vol. 29, Issue 3, Feb. 1, 2006, pp. 280-290.*
H. Cheng and Xiaobo Li, "Partial encryption of compressed images and videos," in IEEE Transactions on Signal Processing, vol. 48 , No. 8, pp. 2439-2451, Aug. 2000.*
U.S. Appl. No. 13/654,953, filed Oct. 18, 2012, Zeger, et al.
U.S. Appl. No. 13/655,034, filed Oct. 18, 2012, Medard, et al.
U.S. Appl. No. 13/890,604, filed May 9, 2013, Zeger, et al.
U.S. Appl. No. 14/208,683, filed Mar. 13, 2014, Calmon, et al.
"Data Service Options for Spread Spectrum Systems: Radio Link Protocol Type 3;" 3GPP2 C.S0017-010-A; Version 2.0; Sep. 2005.
"Guest Editorial Wireless Video Transmission;" IEEE Journal on Selected Areas in Communications; vol. 28; No. 3; Apr. 2010; pp. 297-298.
Abichar, et al.; "WiMax vs. LTE: Who Will Lead the Broadband Mobile Internet?;" Mobile Computing; IEEE Computer Society; IT Pro May/Jun. 2010; pp. 26-32.
AbuZeid, et al.; "IR-HARQ vs. Joint Channel-Network Coding for Cooperative Wireless Communication;" Cyber Journals: Multidisciplinary Journals in Science and Technology, Journal of Selected Areas in Telecommunications (JSAT); Aug. 2011; pp. 39-43.
Acedanski, et al.; "How Good is Random Linear Coding Based Distributed Network Storage?;" Proc. 1st Workshop on Network Coding, Theory, and Applications (Netcod'05): Apr. 2005; 6 pages.
Adamson, et al.; "Multicast Negative-Acknowledgment (NACK) Building Blocks;" Internet Engineering Task Force (IETF),RFC; vol. 5401; Nov. 2008; 42 pages.
Adamson, et al.; "NACK-Oriented Reliable (NORM) Transport Protocol;" Internet Engineering Task Force (IETF); RFC; vol. 5740; Nov. 2009; 94 pages.
Adamson, et al.; "Quantitative Prediction of NACK-Oriented Reliable Multicast (NORM) Feedback;" Proceedings, MILCOM 2000; vol. 2; Oct. 2002; 6 pages.
Ahlswede, et al.; "Network Information Flow;" IEEE Transactions on Information Theory; vol. 46; No. 4; Jul. 2000; pp. 1204-1216.
Ahmed, et al.; "On the Scaling Law of Network Coding Gains in Wireless Networks;" IEEE; MILCOM 2007; Oct. 2007; 7 pages.
Allman, et al.; "Fast Retransmit / Fast Recovery—TCP Congestion Control;" IETF; Section 3.2; RFC 2581; http://tools.ietf.org/html/rfc2581#section-3.2; Apr. 1999; downloaded on Nov. 2, 2011; 14 pages.
Armstrong, et al.; "Distributed Storage with Communication Costs;" IEEE Forty-Ninth Annual Allerton Conference—Allerton House; Sep. 28-30, 2011; pp. 1356-1365.
Awerbuch, et al.; "On-Line Generalized Steiner Problem;" Proceedings of the 7th Annual ACM-SIAM Symposium on Discrete Algorithms; pp. 1-12; 1996.
Baek, et al.; "The International Journal of Computer and Telecommunications Networking;" vol. 56; Issue 6; Apr. 2012; pp. 1745-1762.
Baron, et al.; "Coding Schemes for Multislot Messages in Multichannel ALOHA With Deadlines;" IEEE Transactions on Wireless Communications; vol. 1; No. 2; Apr. 2002; pp. 292-301.
Bellare, et al.; "A Concrete Security Treatment of Symmetric Encryption: Analysis of the DES Modes of Operation;" Proc 38th Annual Symposium on Foundations of Computer Science; Oct. 1997, pp. 1-32.
Berman, et al.; "Improved Approximations for the Steiner Tree Problem;" Journal of Algorithms; Chapter 39; pp. 325-334.
Bhadra, et al.; "Looking at Large Networks: Coding vs. Queuing;" Proc. Of the 25th IEEE International Conference on Computer Communications (INFOCOM); Apr. 2006; 12 pages.
Bharath-Kumar, et al.; "Routing to Multiple Destinations in Computer Networks;" IEEE Transactions on Communications; vol. Com-31; No. 3; Mar. 1983; pp. 343-351.
Bhargava, et al.; "Forward Error Correction Coding;" Mobile Communications Handbook; Part 1: Basic Principals; 1999; 18 pages.
Birk, et al.; "Judicious Use of Redundant Trasmissions in Multichannel ALOHA Networks with Deadlines;" IEEE Journal on Selected Areas In Communcations; vol. 17; No. 2; Feb. 1999; pp. 257-269.
Bisson, et al.; "Reducing Hybrid Disk Write Latency with Flash-Backed I/O Requests;" Proceedings of the Fifteenth IEEE International Symposium on Modeling, Analysis, and Simulation of Computer and Telecommunications Systems (MASCOTS'07); Oct. 2007; pp. 402-409.
Bonnin, et al.; "Automatic Multi-Interface Management Through Profile Handling;" Spring; Mobile Networks and Applications; Feb. 2009; pp. 4-17.
Borokhovich, et al.; "Tight bounds for Algebraic Gossip on Graphs;" Proc. Of the IEEE International Symposium on Information Theory (ISIT); Jun. 13-18, 2010; 14 pages.
Borst, et al.; "Distributed Caching Algorithms for Content Distribution Networks"; IEEE INFOCOM; 2010 Proceedings IEEE; Mar. 14-19, 2010; 9 pages.
Borst, et al.; "Distributed Caching Algorithms for Content Distribution Networks;" Power Point Presentation; BCAM Seminar; Bilbao, Sep. 30, 2010; 36 pages.
Bui, et al.; "A Markovian Approach to Multipath Data Transfer in Overlay Networks;" IEEE Transactions on Parallel and Distributed Systems; vol. 21; No. 10; Oct. 2010; pp. 1398-1411.
Cai, et al.; "Secure Network Coding;" IEEE; ISIT; Jun. 30-Jul. 5, 202; p. 323.
Calmon, et al.; "Network Coding Over Multiple Network Interfaces Using TCP;" Presentation; Information Theory and Applications Workshop (ITA) 2012; San Diego, CA; Feb. 5, 2012; 55 pages.
Cardinal, et al.; "Miminum Entrophy Combinatorial Optimization Problems;" Data Structure and Algorithms, Discrete Mathematics; Aug. 17, 2010; pp. 1-16.
Castro, et al.; "Upper and Lower Bounds for Active Learning;" The 44'th Annual Allerton Conference on Communication, Control and Computing; vol. 2; No. 2.1; 2006, 10 pages.
Celik, et al.; "MAC for Networks with Multipacket Reception Capability and Spatially Distributed Nodes;" Proc. IEEE INFOCOM 2008; Apr. 2008; 9 pages.
Celik; "Distributed MAC Protocol for Networks with Mutlipacket Reception Capability and Spatially Distributed Nodes;" Master's Thesis; MIT Department of Electrical Engineering and Computer Science; May 2007; 127 pages.
Cha, et al.; "I Tube, You Tube, Everybody Tubes: Analyzing the World's Largest User Generated Content Video System;" 7th ACM GIGCOMM Conference on Internet Measurement; IMC'07; Oct. 24-26, 2007; 13 pages.
Chakrabarti, et al.; "Approximation Algorithms for the Unsplittable Flow Problem;" Proceedings of the 5th International Workshop on Approximation Algorithms for Combinatorial Optimization; Sep. 2005, pp. 1-27.
Chakrabarti, et al.; Approximation Algorithms for the Unsplittable Flow Problem; Algorithmica (2007); Springer Science—Business Media, Aug. 2006; 16 pages.
Charikar, et al.; "Approximation Algorithms for Directed Steiner Problems;" Proceedings of the 9th ACM-SIAM Symposium on Discrete Algorithms, pp. 1-15; 1998.
Chen, et al.; "Pipeline Network Coding for Mulicast Streams;" ICMU Org.; 2010; 7 pages.
Chou, et al.; "FEC and Pseudo-ARQ for Receiver-driven Layered Multicast of Audio and Video;" Date Compression Conference (DCC), 2000; Proceedings; Jan. 2000; 10 pages.
Chou, et al.; "Practical Network Coding;" Proceedings of the 41st Annual Allerton Conference on Communication, Control, and Computing; Oct. 2003; 10 pages.
Cisco Visual Networking Index: Forecast and Methodology; 2009-2014; White Paper; Jun. 2, 2010; pp. 1-17.

(56) References Cited

OTHER PUBLICATIONS

Cloud, et al.; "Co-Designing Multi-Packet Reception, Network Coding, and MAC Using a Simple Predictive Model;" arXiv:1101.5779v1 [es.NI]; Submitted to W.Opt 2011;Jan. 30, 2011; pp. 1-8.
Cloud, et al.; "Effects of MAC approaches on non-monotonic saturation with COPE—a simple case study;" Military Communication Conference, 2011—MILCOM; Aug. 11, 2011; 7 pages.
Cloud, et al.; "MAC Centered Cooperation—Synergistic Design of Network Coding, Multi-Packet Reception, and Improved Fairness to Increase Network Throughput;" IEEE Journal on Selected Areas in Communications; vol. 30; No. 2; Feb. 2012; pp. 1-8.
Cloud, et al.; "Multi-Path TCP with Network Coding;" Wireless©mit—MIT Center for Wireless Networks and Mobiie Computing; 2012 Inaugural Retreat; Oct. 10-11, 2012.
Cloud, et al; U.S. Appl. No. 13/654,953, filed Oct. 18, 2012.
Costa, et al.; "Informed Network Coding for Minimum Decoding Delay;" Fifth IEEE International Conference on Mobile Ad-hoc and Sensor Systems; Sep. 2008; pp. 80-91.
Coughlin, et al.; Years of Destiny: HDD Capital Spending and Technology Developments from 2012-2016; IEEE Santa Clara Valley Magnetics Society; Jun. 19, 2012; pp. 1-28.
Dana, et al.; "Capacity of Wireless Erasure Networks;" IEEE Transactions on Information Theory; vol. 52; No. 3; Mar. 2006; pp. 789-804.
Dana, et al.; "Capacity of Wireless Erasure Networks;" Jan. 2006; 41 pages.
Deb, et al.; "Algebraic Gossip: A Network Coding Approach to Optimal Multiple Rumor Mongering;" Proc. Of the $42^{nd}$ Allerton Conference on Communication, Control, and Computing; Jan. 2004; 10 pages.
Deb, et al.; "On Random Network Coding Based Information Dissemination;" Proc. Of the IEEE International Symposium on Information Theory (ISIT); Sep. 4-9, 2005; 5 pages.
Demers, et al.; "Epidemic Algorithms for Replicated Database Maintenance;" PODC '87 Proceedings of the sixth annual ACM Symposium on Principles of distributed computing; Jan. 1987; pp. 1-12.
Dias, et al.; "Performance Analysis of HARQ in WiMax Networks Considering Imperfect Channel Estimation;" The $7^{th}$ International Telecommunications Symposium (ITS 2010); 2010; 5 pages.
Dimakis, et al.; "A Survey on Network Codes for Distributed Storage;" Proceedings of the IEEE; vol. 99; No. 3; Mar. 2011; pp. 476-480.
Dimakis, et al; "Network Coding for Distributed Storage Systems;" IEEE/ACM Transactions on Information Theory; vol. 56; No. 9; pp. 1-13.
Donoho, et al.; "Estimating Covariances of Locally Stationary Processes: Rates of Convergence of Best Basis Methods;" Statistics, Stanford University, Stanford, California, USA, Tech. Rep; 1998; pp. 1-64.
Effros; Distortion-Rate Bounds for Fixed-and Variable-Rate Multiresolution Source Codes; IEEE Transactions on Information Theory; vol. 45, No. 6; Sep. 1999; pp. 1887-1910.
Effros; "Universal Multiresolution Source Codes;" IEEE Transactions on Information Theory; vol. 47; No. 6; Sep. 2001; pp. 2113-2129.
El Bahri, et al.; "Performance Comparision of Type I, II, and III Hybrid ARQ Schemes over AWGN Channels;" 2004 IEEE International Conference on Industrial Technology (ICIT); vol. 3; Dec. 8-10, 2004; pp. 1417-1421.
Eryilmaz, et al.; On Delay Performance Gains From Network Coding; Information Sciences and Systems; 2006 $40^{th}$ Annual Conference on Mar. 22-24, 2006; 7 pages.
Fan, et al.; "Reliable Relay Assisted Wireless Multicast Using Network Coding;" IEEE Journal on Selected Areas in communications; vol. 27; No. 5; Jun. 2009; pp. 749-762.
Feizi, et al.; "Locally Adaptive Sampling;" Communication, Control, and Computing; 2010; $48^{th}$ Annual Allerton Conference, IEEE; Sep. 29, 2010; pp. 152-159.
Feizi, et al.; "On Networking Functional Compression;" arXiv online repository; URL: http://arxiv.org/pdf/1011.5496v2.pdf; Nov. 30, 2010p pp. 1-60.
Feizi, et al.; "When Do Only Sources Need to Compute? On Functional Compression in Tree Networks;" $47^{th}$ Annual Allerton Conference, IEEE; Sep. 30, 2009; pp. 447-454.
Feizi, et al; "Cases Where Finding a Minimum Entrophy Coloring of a Characteristic Graph is a Polynomial Time Problem;" IEEE International Symposium on Information Theory; Jun. 13, 2010; pp. 116-120.
Ferner, et al.; "Toward Sustainable Networking: Storage Area Networks with Network Coding;" Fiftieth Annual Allerton Conference; IEEE; Oct. 1-5, 2012, pp. 517-524.
Ford; "Architectural Guidelines for Mulitpath TCP Development;" Internet Engineering Task Force; Internet-Draft; Dec. 8, 2010; 17 pages.
Ford; "TCP Extension for Multipath Operation with Multiple Addresses draft-ford-mptcp-multiaddressed-03;" Internet Engineering Task Force; Internet-Draft; Mar. 8, 2010; 35 pages.
Fragouli, et al.; "Wireless Network Coding: Opportunites & Challenges;" MILCOM; Oct. 2007; 8 pages.
Frossard, et al.; "Media Streaming With Network Diversity;" Invited Paper: Proceedings of the IEEE; vol. 96; No. 1; Jan. 2008; pp. 39-53.
Galbraith, et al.; (HGST); "Iterative Detection Read Channel Technology in Hard Disk Drives;" Whitepaper; Nov. 2008; 8 pages.
Garcia-Luna-Aceves; "Challenges: Towards Truly Scalable Ad Hoc Networks;" MobiCom 2007; Sep. 2007; pp. 207-214.
Garcia-Luna-Aceves; "Extending the Capacity of Ad Hoc Networks Beyond Network Coding;" IWCMC 07; Proceedings of the 2007 International Conference on Wireless Communications and Mobile Computing; ACM; 2007; pp. 91-96.
Ghaderi, et al.; Reliability Gain of Network Coding in Lossy Wireless Networks; Infocom 2008; The $27^{th}$ Conference on Computer Communications IEEE; Apr. 13-18, 2008; 5 pages.
Gheorghiu, et al.; "Multipath TCP with Network Coding for Wireless Mesh Networks;" IEEE Communication (ICC) 2010 International Conference; May 23-27, 2010; 5 pages.
Gheorghiu, et al.; "On the Performance of Network Coding in Multi-Resolution Wireless Video Streaming;" IEEE International Symposium on Jun. 9-11, 2010; 6 pages.
Ghez, et al.; "Stability Properties of Slotted Aloha with Multipacket Reception Capability;" IEEE Transactions on Automatic Control; vol. 33; No. 7; Jul. 1988; pp. 640-649.
Gkantsidis, et al.; "Cooperative Security for Network Coding File Distribution;" Proc. IEEE Infocom; Apr. 2006; 13 pages.
Gollakota, et al.; "ZigZag Decoding: Combating Hidden Terminals in Wireless Networks;" SIGCOMM 08; Aug. 17-22; pp. 159-170.
Golrezaei, et al.; "FemtoCaching: Wireless Video Content Delivery Through Distributed Caching Helpers;" arXiv:1009.4179v2; Apr. 7, 2012; pp. 1-11.
Grant, et al.; "Graph Implementation for Nonsmooth Convex Programs;" LNCIS 371; Springer-Verlag Limited; Jan. 2008; pp. 95-110.
Gupta; "The Capacity of Wireless Networks;" IEEE Transactions on Information Theory; vol. 46; No. 2; Mar. 2000, pp. 388-404.
Hadzi-Velkov, et al.; "Capture Effect in IEEE 802.11 Basic Service Area Under Influence of Rayleigh Fading and Near/Far Effect;" IEEE; PIMRC 202; vol. 1; Sep. 2002; 5 pages.
Haeupler, et al.; "One Packet Suffices—Highly Efficient Packetized Network Coding With Finite Memory;" IEEE International Symposium on Information Theory (ISIT) Proceedings; Jul. 31, 2011-Aug. 5, 2011; 5 pages.
Haeupler; "Analyzing Nework Coding Gossip Made Easy;" Proc. Of the $43^{rd}$ Symposium on Theory of Computing (STOC); Jan. 2011, 13 pages.
Haeupler, et al.; "Optimality of Network Coding in Packet Networks;" ArXiv, Feb. 17, 2011; 5 pages.
Haley, et. al.; "Reversible Low-Density Parity-Check Codes;" IEEE Transactions on Information Theory; vol. 55; No. 5; May 2009; pp. 2016-2036.

(56) References Cited

OTHER PUBLICATIONS

Halloush, et al.; "Nework Coding with Multi-Generation Mixing: Analysis and Applications for Video Communication;" IEEE International Conference on Communications; May 19, 2008; pp. 198-202.
Han, et al.; "Multi-Path TCP: A Joint Congestion Control and Routing Scheme to Exploit Path Diversity in the Internet;" IEEE/ACM Transactions on Networking (TON); vol. 14; No. 6; Dec. 2006; 26 pages.
Han, et al.; "On Network Coding for Security;" IEEE Military Communications Conference; Oct. 2007; pp. 1-6.
Hassner, et al.; "4K Bye-Sector HDD-Data Format Standard;" Windows Hardware and Driver Central; San Jose, CA; Aug. 14, 2013; 5 pages.
Ho, et al.; "A Random Linear Network Coding Approach to Multicast;" IEEE Transactions on Information Theory; vol. 52; No. 10; Oct. 2006, pp. 4413-4430.
Ho, et al.; "Byzantine Modification Detection in Multicast Networks using Randomized Network Coding;" IEEE; ISIT; Jun. 27-Jul. 2, 2004; p. 144.
Ho, et al.; "Nework Coding from a Network Flow Perspective;" ISIT; Jun.-Jul. 2003; 6 pages.
Ho, et al.; "On Randomized Network Coding;" Proceedings of the 41st Annual Allerton Conference on Communications, Control and Computing; Oct. 2003; 10 pages.
Ho, et al.; "On the utility of network coding in dynamic environments;" International Workshop on Wirelss AD-HOC Networks (IWWAN); 2004; pp. 1-5.
Ho, et al.; "The Benefits of Coding over Routing in a Randomized Setting;" Proceedings of 2003 IEEE International Symposium on Information Theory; Jun. 2003; pp. 1-6.
Ho, et al.; "The Benefits of Coding over Routing in a Randomized Setting;" IEEE; ISIT Jun. 29-Jul. 4, 2003; p. 442.
Hofri; "Disk Scheduling FCFS vs. SSTF Revisited;" Communications of the ACM; vol. 23; No. 11; Nov. 1980; pp. 645-653.
Hong, et al.; Network-coding-based hybrid ARQ scheme for mobile relay networks; Electronics Letters; vol. 46; No. 7; Apr. 1, 2010; 2 pages.
International Disk Drive Equipment and Materials Assoc.; "Advanced Standard;" in Windows Hardware Engineering Conf.; May 2005; 11 pages.
Iyer, et al.; "Anticipatory scheduling: A disk scheduling framework to overcome deceptive idleness in synchronous I/O;" SIGOPS Operating Sys. Review; vol. 35; No. 5; Dec. 2001; 14 pages.
Jacobson, et al.; "Disk scheduling algorithms based on rotational position;" Hewlett-Packard laboratories; Palo Alto, CA; Technical Report HPL-CSP-91-7rev1; Feb. 26, 1991; 17 pages.
Jaggi, et al.; "Low Complexity Algebraic Multicast Network Codes;" Proceedings of the IEEE International Symposium on Information Theory; Jul. 4, 2003; 1 page.
Jaggi, et al.; "Resillient Network Coding in the Presence of Byzantine Adversaries;" Proc. IEEE INFOCOM; May 2007; 9 pages.
Jakubczak, et al.; "One-Size-Fits-All Wireless Video;" ACM SigComm Hotnets 2009; 6 pages.
Jamieson, et al.; "PPR: Partial Packet Recovery for Wireless Networks;" SIGCOMM 07; Aug. 27-31, 2007; 12 pages.
Jamieson, et al.; "PPR: Partial Packet Recovery for Wireless Networks;" Presentation; SIGCOMM 07; Aug. 27-31, 2007; 25 pages.
Jannaty, et al.; "Full Two-Dimensional Markov Chain Analysis of Thermal Soft Errors in Subthreshold Nanoscale CMOS Devices;" IEEE Transactions on Device and Materials Reliability; vol. 11; No. 1; Mar. 2011; pp. 50-59.
Ji, et. al; "A Network coding based hybrid ARQ algorithm for wireless video broadcast;" Science China; Information Sciences; vol. 54; No. 6; Jun. 2011; pp. 1327-1332.
Jin, et al.; "Adaptive Random Network Coding in WiMAX;" Communications, 2008; ICC'08 IEEE International Conference on May 19-23, 2008; 5 pages.
Jin, et al.; "Is Random Network Coding Helpful in WiMax;" IEEE 27th Conference on Computer Communications; Apr. 2008; 5 pages.
Jolfaei, et al.; "A New Efficient Selective Repeat Protocol for Point-To_Multipoint Communication;" Communications 1993; ICC'93 Genova Technical Program, Conference Record; IEEE International Conference On May 23-26, 1993; vol. 2; pp. 1113-1117.
Karkpinski, et al.; "New Approximation Algorithms for the Steiner Tree Problems;" Technical Report, Electronic Colloquium on Computational Complexity (ECCC) TR95-030; 1995; pp. 1-17.
Karp, et al.; "Randomized Rumor Spreading;" IEEE Proceeding FOCS '00 Proceedings of the 41st Annual Symposium on Foundations of Computer Science; Jan. 2000; pp. 565-574.
Katti, et al.; "XORs in the Air, Practical Wireiess Network Coding;" IEEE/ACM Transactions on Networking: vol. 16 No. 3; 2008 pp. 1-14.
Katti, et al.; "XORs in The Air: Practical Wireless Network Coding;" ACM SIGCOMM '06; Computer Communications Review; vol. 36; Sep. 11-15, 2006; 12 pages.
Kempe, et al.; "Protocols and impossibility Results for Gossip-Based Communication Mechanisms;" Foundations of Computer Science, Jan. 2002; Proceedings. The 43rd Annual IEEE Symposium; pp. 471-480.
Key, et al.; "Combining Muitipath Routing and Congestion Control for Robustness;" In Proceedings of IEEE CISS, 2006, 6 pages.
Kim, et al.; "Modeling Network Coded TCP Throughout: A Simple Model and its Validation;" VALUETOOLS '11 Proceedings of the 5th International ICST Conference on Performance Evaluation Methodologies and Tools; May 16-20, 2011; 10 pages.
Kim, et al.; "Modeling Network Coded TCP Throughput: A Simple Model and its Validation", Cornell University Library, http://arxiv.org/abs/1008.0420, Aug. 2010, 3 pages.
Kim, et al.; "Network Coding for Multi-Resolution Multicast;" IEEE INFOCOM 2010; Mar. 2010; 9 pages.
Kim, et al.; "Transform-free analysis of the GI/G/1/K queue through the decomposed Little's formula;" Computers and Operations Research; vol. 30; No. 3; Mar. 2003; pp. 1-20.
Kim, et al.; "Modeling Network Coded TCP Throughput: A Simple Model and its Validation", arXiv: 1008.0420v1 [cs.IT] Aug. 2, 2010; 9 pages.
Kim, et al.; "Modeling Network Coded TCP Throughput: A Simple Model and its Validation", Nov. 2010, Presentation; 19 pages.
Kodialam, et al.; "Online Muiticast Routing With Bandwidth Guarantees: A New Approach Using Multicast Network Flow;" IEEE/ACM Transactions on Networking; vol. 11; No. 4; Aug. 2003; pp. 676-686.
Koetter, et al.; "An Algebraic Approach to Network Coding;" IEEE/ACM Transactions on Networking; vol. 11, No. 5; Oct. 2003; pp. 782-795.
Koetter, et al.; "Beyond Routing: An Algebraic Approach to Network Coding;" IEEE Infocom; 2002; 9 pages.
Koutsonikolas, et al.; "Efficient Oniine WiFi Delivery of Layered-Coding Media using Inter-layer Network Coding;" Distributed Computing Systems (ICDCS); 2011 31st International Conference on Jun. 2011; 11 pages.
Kritzner, et al.; "Priority Based Packet Scheduling with Tunable Reliabiiity for Wireless Streaming;" Lecture Notes in Computer Science; 2004; pp. 707-717.
Kuhn, et al.; "Distributed Computation in Dynamic Networks;" Proc. Of the 42rd Symposium on Theory of Computing (STOC); Jun. 5-6, 2010; 10 pages.
Lai; "Sequential Analysis: Some Classical Problems and New Challenges"; Statistica Sinica, vol. 11, No. 2; 2001; pp. 303-350.
Landau; "Application of the Volterra Series to the Analysis and Design of an Angle Track Loop;" IEEE Transactions on Aerospace and Electronic Systems; vol. AES-8, No. 3; May 1972; pp. 306-318.
Larsson, et al.; "Analysis of Network Coded HARQ for Multiple Unicast Flows;" Communication (ICC) 2010 IEEE International Conference on May 23-27, 2010 pp. 1-6.
Larsson, et al.; "Multi-User ARQ;" Vehicular Technology Conference; 2006; VTC (2006-Spring); IEEE 63rd; vol. 4; May 7-10, 2006; pp. 2052-2057.
Larsson; "Analysis of Multi-User ARQ with Multiple Unicast Flows Under Non-iid Reception Probabilities;" Wireless Communication and Networking Conference 2007; WCNC 2007; IEEE; Mar. 11-15, 2007; pp. 384-388.

(56) References Cited

OTHER PUBLICATIONS

Larsson; "Multicast Multiuser ARQ;" Wireless Communications and Networking Conference (WCNC) 2008; IEEE; Apr. 3, 2008; pp. 1985-1990.
Le, et al.; "How Many Packets Can We Encode?—An Analysis of Practical Wireless Network Coding;" INFOCOM 2008; The 27th Conference on Computer Communications, IEEE; 2008; pp. 1040-1048.
Lee, et al.; "Content Distribution in VANETs using Network Coding: The Effect of Disk I/O and Processing O/H;" Proc. IEEE SECON; Jan. 2008; pp. 117-125.
Lehman, et al; "Complexity Classification of Network Information Flow Problems;" SODA 04' Proceedings of the fifteenth annual ACM-SIAM symposium on Discrete algorithms; Jan. 2004; pp. 9-10.
Li, et al.; "N-in-1 Retransmission with Network Coding;" IEEE Transactions on Wireless Communications; vol. 9; No. 9; Sep. 2010; pp. 2689-2694.
Li, et al.; "Robust and Flexible Scalable Video Multicast with Network Coding over P2P Network;" 2nd International Congress on Image and Signal Processing, IEEE: Oct. 17, 2009; pp. 1-5.
Li, et al.; "Linear Network Coding;" IEEE Transactions on Information Theory; vol. 49; No. 2; Feb. 2003; pp. 371-381.
Lima, et al.; "An Information-Theoretic Cryptanalysis of Network Coding—is Protecting the Code Enough;" International Symposium on Information Theory and its Applications; Dec. 2008; 6 pages.
Lima, et al.; "Random Linear Network Coding: A free cipher? "IEEE International Symposium on Information Theory; Jun. 2007; pp. 1-5.
Lima, et al.; "Secure Network Coding for Multi-Resolution Wireless Video Streaming;" IEEE Journal on Selected Areas in Communications; vol. 28; No. 3; Apr. 2010; pp. 377-388.
Lima, et al.; "Towards Secure Multiresolution Network Coding;" IEEE Information Theory Workshop; Jun. 12, 2009; pp. 125-129.
Liu, et al.; "The Throughput Order of Ad Hoc Networks Employing Network Coding and Broadcasting;" Military Communications Conference; MILCOM 2006; Oct. 2006; pp. 1-7.
Liu, et al.; "Using Layered Video to Provide Incentives in P2P Live Streaming;" P2P-TV07: Proceedings of the 2007 Workshop on Peer-to-peer Streaming and IP-TV; Aug. 31, 2007 ACM; 6 pages.
Luby, et al.; "The Use of Forward Error Correction (FEC) in Reliable Multicast;" Internet Society Request for Comments; RFC 3453; Dec. 2002; 18 pages.
Lucani et al.; "On Coding for Delay New Approaches based on Network Coding in Network Coding in Networks with Large Latency;" Presentation in NetCod; Slide Presentation; Jun. 16, 2009; 17 pages.
Lucani et al; "Broadcasting in Time-Division Duplexing: A Random Linear Network Coding Approach;" presented Switzerland; Conference: NetCod 2009, Lausanne, Switzerland; Jun. 2009; 6 pages.
Lucani et al; "On Coding for Delay—New Approaches Based on Network Coding in Networks with Large Latency;" Conference: ITA Workshop, San Diego, USA; Feb. 2009; 10 pages.
Lucani et al; "On Coding for Delay New Approaches based on Network Coding in Networks with Large Latency;" Conference ITA Workshop, San Diego, USA; Slide Presentation; Feb. 13, 2009; 11 pages.
Lucani et al; "Random Linear Network Coding For Time Division Duplexing: Energy Analysis;" Conference: ICC 2009, Dresden, Germany; Jun. 2009; 5 pages.
Lucani et al; "Random Linear Network Coding for Time-Division Duplexing: when to stop talking and start listening;" Presentation in ICC; Slide Presentation; Jun. 16, 2009; 6 pages.
Lucani et al; "Random Linear Network Coding for Time-Division Duplexing: when to stop talking and start listening;" Presentation in INFOCOM; Slide Presentation; Apr. 23, 2009; 10 pages.
Lucani et al; "Random Linear Network Coding for Time-Division Duplexing: Queueing Analysis;" Conference ISIT 2009, Seoul, Korea; Jul. 2009; 5 pages.
Lucani et al; "Random Linear Network Coding For Time-Division Duplexing: Field Size Considerations;" Conference: GLOBECOM 2009, Hawaii, USA; Dec. 2009; 6 pages.
Lucani, et al.; "Network Coding For Data Dissemination: It Is Not What You Know, But What Your Neighbors Don't Know;" Modeling and Optimization in Mobile, AdHoc, and Wireless Networks 2009; WiOPT 2009; 7th International Symposium on Jun. 23-27, 2009; pp. 1-8.
Lucani, et al.; "Networking Coding Schemes for Underwater Networks;" WUWNet 07; Sep. 14, 2007; pp. 25-32.
Lucani, et al.; "Systematic Network Coding for Time-Division Duplexing;" Proceedings of the IEEE International Symposium on Information Theory (ISIT); ; Jun. 13-18, 2010; pp. 2403-2407.
Lun, et al.; "Further Results on Coding for Reliable Communication over Packet Networks;" Information Theory, ISIT 2005 Proceedings International Symposium on Sep. 4-9, 2005; 5 pages.
Lun, et al.; "On Coding for Reliable Communication Over Packet Networks;" Physical Communication; vol. 1; No. 1; Jan. 2008; pp. 10 pages.
Lun, et al.; "On Coding for Reliable Communication over Packet Networks;" LIDS Publication #2741; Jan. 2007; 33 pages.
Lun, et al.; An Analysis of Finite-Memory Random Linear Coding on Packet Streams; Modeling and Optimization in Mobile, Ad Hoc and Wireless Networks; Apr. 3-6, 2006; pp. 1-6.
Lun; "Efficient Operation of Coded Packet Networks;" Ph.D. Dissertation; Massachusetts Institute of Technology; Jun. 2006; 130 pages.
Magli, et al.; "An Overview of Network Coding for Multimedia Streaming;" IEEE International Conference; Jun. 28, 2009; pp. 1488-1491.
Mallat, et al.; "Adaptive Covariance Estimation of Locally Stationary Processes;" Annals of Statistics, vol. 26, No. 1; 1998; pp. 1-43.
Manssour, et al.; "A Unicast Retransmission Scheme based on Network Coding;" IEEE Transactions on Vehicular Technology; vol. 61; Issue 2; Nov. 2011; 7 pages.
Maymounkov, et al.; "Methods for Efficient Network Coding;" Proc. Of the 44th Allerton Conference on Communication, Control, and Computing; Sep. 2006; 10 pages.
Médard, et al.; "On Coding for Non-Multicast Networks;" invited paper, 41st Allerton Annual Conference on Communication, Control; Outgrowth of supervised student research Publications of Muriel Médard and Computing; vol. 1; Oct. 2003; 9 pages.
Medard; "Some New Directions for Network Coding in Content Distribution", RLE, EECS, MIT, Seminar to Alcatel Lucent, Nov. 2010, 29 pages.
Merchant, et al.; "Analytic Modeling of Clustered RAID with Mapping Based on Nearly Random Permutation;" IEEE Transactions on Computers; vol. 45; No. 3; Mar. 1996; pp. 367-373.
Metzner; "An Improved Broadcast Retransmission Protocol;" IEEE Transactions on Communications; vol. COM-32; No. 6; Jun. 1984; pp. 679-683.
Mosk-Aoyama, et al.; "Information Dissemination via Network Coding;" ISIT 2006; IEEE; Jul. 9-14, 2006; pp. 1748-1752.
Moyer, et al.; "A Survey of Security Issues in Multicast Communications;" IEEE Network; vol. 13; No. 6; Nov./Dec. 1999; pp. 12-23.
Nguyen, et al.; "Internet Media Streaming Using Network Coding and Path Diversity;" IEEE Global Telecommunications Conference; Nov. 30-Dec. 4, 2008; 5 pages.
Nguyen, et al.; "Wireless Broadcast Using Network Coding;" Vehicular Technology IEEE Transactions on Feb. 2009; vol. 58; Issue 2; 25 pages.
Nguyen, et al; "Video Streaming with Network Coding;" Journal of Signal Processing Systems; vol. 59, Issue 3; DOI: 10.1007/s11265-009-0342-7; Jun. 2010; 25 pages.
Nobel; "Hypothesis Testing for Families for Ergodic Processes;" Bernoulli-London, vol. 12, No. 2; 2006; 21 pages.
Noguichi, et al.; "Performance Evaluation of New Multicast Architecture with Network Coding;" IEICE Transactions on Communication, E86-B; No. 6; Jun. 2003; 3 pages.
NS Version 1—LBNL Network Simulator; web page—http://ee.lel.gov/ns; Mar. 21, 2011; 3 pages.

(56) References Cited

OTHER PUBLICATIONS

Nyandoro, et al.; "Service Differentiation in Wireless LANs based on Capture;" IEEE GLOBECOM 2005; vol. 6; Dec. 2005; 5 pages.
Oliveira, et al.; "A Network Coding Approach to Secret Key Distribution;" IEEE Transactions on Information Forensics and Security; vol. 3; No. 3; pp. 414-423; Sep. 2008.
ParandehGhelbi, et al.; "Access-Network Association Policies for Media Streaming in Heterogeneous Environments;" Apr. 2010; pp. 1-8.
Peng, et al.; "Research on Network Coding based Hybrid-ARQ Scheme for Wireless Networks;" Communication Systems (ICCS); 2010 IEEE International Conference on Nov. 17-19, 2010; pp. 218-222.
Popovivi, et al.; "Robust, Portable I/O Scheduling with the Disk Mimic;" Proc. USENIX Annual Tech. Conf. San Antonio, Texas, Jun. 2003; 14 pages.
Qureshi, et al.; "An Efficient Network Coding based Retransmission Algorithm for Wireless Multicast;" Personal, Indoor and Mobile Radio Communications, 2009 IEEE 20th International Symposium on Sep. 13-16, 2009; 5 pages.
Radunovic, et al.; "Horizon: Balancing TCP Over Multiple Paths in Wireless Mesh Network;" Proc. 14th ACM International Conference on Mobile Computing and Networking; Sep. 2008; 12 pages.
Ramanathan; "Multicast Tree Generation in Networks with Asymmetric Links;" IEEE Transactions on Networking; vol. 4; Aug. 1996; pp. 1-12.
Rezaee, et al.; "Multi Packet Reception and Network Coding;" Presentation at The 2010 Military Communications Conference Unclassified Technical Program; Nov. 2, 2010; 15 pages.
Rezaee, et al.; "An Analysis of Speeding Multicast by Acknowledgment Reduction Technique (SMART) with Homogeneous and Heterogeneous Links—A Method of Types Approach;" Signals, Systems an Computers (ASILOMAR) 2011 Conference; IEEE; Nov. 2011; pp. 21-27.
Rezaee, et al.; "Speeding Multicast by Acknowledgment Reduction Technique (SMART);" ArXiv:1104.2941v2 [cs.NI] Sep. 10, 2011; 6 pages.
Rezaee, et al.; "Speeding Mulicast by Acknowledgment Reduction Technique (SMART) Enabling Robustness of QoE to the Number of Users;" IEEE Journal on Selected Areas in Communication; vol. 30, No. 7; Aug. 2012; pp. 1270-1280.
Rezaee, et.al.; "Multi Packet Reception and Network Coding;" Military Communications Conference; 2010; MILCOM 2010; IEEE; Oct. 31, 2010-Nov. 3, 2010; pp. 1393-1398.
Rezaee; "Network Coding, Multi-Packet Reception, and Feedback: Design Tools for Wireless Broadcast Networks;" Submitted to Department of Electrical Engineering and Computer Science at Massachusetts Institute of Technology; Sep. 2011; 92 pages.
Riemensberger, et al.; "Optimal Slotted Random Access in Coded Wireless Packet Networks;" WiOPt 10: Modeling and Optimization in Mobile, Ad Hoc, and Wireless Networks; Jul. 13, 2010; pp. 374-379.
Roughgarden, et al.; "How Bad is Selfish Routing?" Journal of the ACM; vol. 49, No. 2; Mar. 2002; pp. 236-259.
Ruemmler, et al.; "An introduction to disk drive modeling;" IEEE Computers; vol. 27; No. 3; Mar. 17-29, 1994; 17 pages.
Ryabko, et al.; "On Hypotheses Testing for Ergodic Processes;" Information Theory Workshop; ITW'08; IEEE; 2008; pp. 281-283.
Sanders, et al.; "Polynomial Time Algorithms for Network Information Flow;" 15th ACM Symposium on Parallel Algorithms and Architectures; Jun. 2003; pp. 1-9.
Sayenko, et al.; "Performance Analysis of the IEEE 802.16 ARQ Mechanisim;" MSWiM'07; Oct. 22-26, 2007; pp. 314-322.
Scharf; "MPTCP Application Interface Considerations draft-scharf-mptcp-ap-04;" Internet Engineering Task Force; Internet-Draft; Nov. 22, 2010; 26 pages.
Seferoglu, et al.; "Opportunistic Network Coding for Video Streaming over Wireless;" Packet Video; Nov. 2007; 10 pages.
Sengupta, et al.; "An Analysis of Wireless Network Coding for Unicast Sessions: The Case for Coding-Aware Routing;" in INFOCOM 2007; 26th IEEE International Conference on Computer Communications; Jun. 2007; 9 pages.
Servetto, et al.; "Constrained Random Walks on Random Graphs: Routing Algorithms for Large Scale Wireless Sensors Networks;" WSNA 02; Sep. 28, 2002; 10 pages.
Shenker, et al.; "Pricing in computer networks: reshaping the research agenda;" Telecommunications Policy; vol. 20, No. 3; Jan. 1996; pp. 183-201.
Sherali, et al.; "Recovery of primal solutions when using subgradient optimization methods to solve Lagrangian duals of linear programs;" Elsevier Operations Research Letters 19 (Jan. 1996); pp. 105-113.
Shields; "The Interactions Between Ergodic Theory and Information Theory;" IEEE Transactions on Information Theory, vol. 44, No. 6; Oct. 1998; pp. 2097-2093.
Shrader, et al.; "Systematic wireless network coding;" Military Conference, 2009; MILCOM 2009; IEEE; 7 pages.
Shrader, et al; "Routing and Rate Control for Coded Cooperation in a Satellite-Terrestrial Network;" IEEE: The 2011 Military Communications Conference—Track 2—Network Protocols and Performance; Nov. 7-10, 2011; pp. 735-740.
Shriver, et al.; "An analytic behavior model for disk drives with readahead caches and request reordering;" Proc. SIGMETRICS/ Performance, Joint Conf. on Meas. and Modeling Comp. Sys.; ACM; Jan. 1998; 10 pages.
Song, et al.; "Zero-Error Network Coding for Acyclic Networks;" IEEE Transactions on Information Theory; vol. 49, No. 12; Dec. 2003; pp. 3129-3139.
SongPu, et al.; Performance analysis of joint chase combining and network coding in wireless broadcast retransmission; Wireless Communication, Network and Mobile Computing 2008; WiCOM '08, 4th International Conference on Oct. 12-14, 2008; pp. 1-4.
Soo Suh; "Send-On-Delta Sensor Data Transmission With A Linear Predictor;" Sensors; ISSN 1424-8220; vol. 7; No. 4; Apr. 26, 2007; pp. 537-547.
Sun, et al.; "Cooperative Hybrid-ARQ Protocol with Network Coding;" Communications and Networking in China 2009—ChinaCOM 2009; Fourth International Conference on Aug. 26-28, 2009; pp. 1-5.
Sundaram, et al.; "Multirate Media Streaming Using Network Coding;" Proc. 43rd Allerton Conference on Communication, Control, and Computing; Sep. 2005; 7 pages.
Sundararajan, et al.; "ARQ for Network Coding;" ISIT Proc. Of the IEEE International Symposium on Information Theory (ISIT); Jul. 6-11, 2008; pp. 1651-1655.
Sundararajan, et al.; "Network Coding Meets TCP: Theory and Implementation;" Proceedings of the IEEE; vol. 99, Issue 3; Mar. 2011; pp. 490-512.
Sundararajan, et al.; "Network coding meets TCP;" InfoCOM 2009; IEEE, Apr. 19-25, 2009; pp. 280-288.
Sundararajan, et al.; On Queueing in Coded Networks—Queue Size Follows Degrees of Freedom; IEEE Information Theory Workshop on Information Theory for Wireless Networks (ITW); Jul. 1-6, 2007; 6 pages.
Teerapittayanon, et al.; "Network Coding as a WiMAX Link Reliability Mechanism;" Multiple Access Communication; Lectures Notes in Computer Science; vol. 7642; pp. 1-12; 2012.
Teerapittayanon, et al.; "Performance Enhancements in Next Generation Wireless Networks Using Network Coding: A Case Study in WiMAX;" Massachusetts Institute of Technology; Jun. 2012; 130 pages.
Thobaben; "Joint Network/Channel Coding for Multi-User Hybrid-ARQ;" Source and Channel Coding (SCC) 2008; 7th International ITG Conference on Jan. 14-16, 2008; 6 pages.
Tosun, et al.; "Efficient Multi-Layer Coding and Encryption of MPEG Video Streams;" Proc. 2000 IEEE International Conference on Multimedia and Expo; vol. 1; 2000; pp. 119-122.
Tosun, et al.; "Lightweight Security Mechanisms for Wireless Video Transmission;" Proc. Intl. Conference on Information Technology, Coding and Computing; Apr. 2001; pp. 157-161.

(56) References Cited

OTHER PUBLICATIONS

Tran, et al.; "A Hybrid Network Coding Technique for Single-Hope Wireless Networks;" IEEE Journal on Selected Areas in Communications; vol. 27; No. 5; Jun. 2009; pp. 685-698.
Tran, et al.; "A Joint Network-Channel Coding Technique for Single-Hop Wireless Networks;" Network Coding, Theory and Applications; 2008; NetCod 2008; Fourth Workshop on Jan. 3-4, 2008; pp. 1-6.
Trung, et al.; "Quality Enhancement for Motion JPEG Using Temporal Redunancies;" IEEE Transactions on Circuits and System for Video Technology, vol. 18; No. 5; May 2008; pp. 609-619.
Tsatsanis, et al.; "Network Assisted Diversity for Random Access Wireless Data Networks;" Signals Systems & amp; Computers; IEEE; vol. 1; Nov. 1-4, 1988; pp. 83-87.
Valancius, et al.; "Greening the Internet with Nano Data Centers;" Proc. 5$^{th}$ International Conference on Emerging Neworking Experiments and Technologies; CoNEXT 2009; ACM 2009; Dec. 1-4, 2009; pp. 37-48.
Vasudevan, et al.; "Algebraic Gossip on Arbitrary Neworks;" arXiv:0901. 1444; Jan. 2009; 5 pages.
Velambi, et al.; "Throughput and Latency in Finite-Buffer Line Networks;" IEEE Transactions on Information Theory; vol. 57; No. 6; Jun. 2011; pp. 3622-3643.
Vien, al.; "Network Coding-based Block ACK for Wireless Relay Networks;" Proceedings of IEEE Vehicular Technology Conference (VTC2011-Spring); May 2011; 5 pages.
Vien, et al.; "Network Coding-based ARQ Retransmission Strategies for Two-Way Wireless Relay Networks;" Software, Telecommunications and Computer Network (SoftCOM) 2010; International Conference on Sep. 23-25, 2010; 5 pages.
Vilela, et al.; "Lightweight Security for Network Coding;" IEEE International Conference on Communications; May 2008; 5 pages.
Wang, et al.; "Capacity-Delay Tradeoff for Information Dissemination Modalities in Wireless Networks;" in Information Theory; ISIT 2008; IEEE International Symposium; Jul. 2008; pp. 677-681.
Wang, et al.; "Embracing Inferference in Ad Hoc Networks Using Joint Routing and Scheduling with Multiple Packet Reception;" in INFOCOM 2008; The 27$^{th}$ Conference on Computer Communications; IEEE; Apr. 2008; pp. 1517-1525.
Wang, et al.; Multipath Live Streaming via TCP: Scheme, Performance and Benefits: ACM Transactions on Multimedia Computing, Communications and Applications; vol. 5; No. 3; Article 25; Aug. 2009; pp. 1-23.
Widmer, et al.; "Network Coding for Efficient Communication in Extreme Networks;" Applications, Technologies, Architectures, and Protocols for Computer Communication; Aug. 2005; pp. 284-291.
Wieseltheir, et al.; "Energy Efficient Broadcast and Multicast Trees in Wireless Networks;" Mobile Networks and Applications 7; Jan. 2002; pp. 481-492.
Wieseltheir, et al.; "Energy-Aware Wireless Networking and Directional Antennas: The Case of Session-Based Broadcasting and Multicasting;" IEEE Transactions on Mobile Computing; vol. 1, No. 3; Jul.-Sep. 2002; pp. 176-191.
Wilhelm; "An Anomaly in Disk Scheduling: A Comparison of FCFS and SSTF Seek Scheduling Using an Empirical Model for Disk Access;" Communications of the ACM, vol. 19; No. 1; Jan. 1976; pp. 13-17.
Wu, et al.; "A Trellis Connectivity Analysis of Random Linear Network Coding with Buffering;" Proc. Of the International Symposium on Information Theory (ISIT); Jul. 9-14, 2006; pp. 768-772.
Yazdi, et al.; "Optimum Network Coding for Delay Sensitive Applications in WiMAX Unicast;" IEEE INFOCOM 2009; Apr. 19-25, 2009; pp. 1576-2580.
Yeung; "Multilevel Diversity Coding with Distortion;" IEEE Transactions on Information Theory; vol. 41, No. 2; Mar. 1995, pp. 412-422.
Yong, et al.; "XOR Retransmission in Multicast Error Recovery;" Networks 2000; ICON; Proceedings IEEE International Conference on Sep. 5-8, 2000; pp. 336-340.
Yun, et al.; "High-Throughput Random Access Using Successive Interference Cancellation in a Tree Algorithm;" IEEE Transactions on Information Theory; vol. 52; No. 12; Dec. 2007; pp. 4628-4639.
Yun, et al.; "Towards Zero Retransmission Overhead: A Symbol Level Network Coding Approach to Retransmission;" IEEE Transactions on Mobile Computing; vol. 10; No. 8; Aug. 2011; pp. 1083-1095.
Zeger; "Packet Erasure Coding with Random Access to Reduce Losses of Delay Sensitive Multislot Messages;" IEEE; Paper ID #900482; Aug. 18, 2009; pp. 1-8.
Zhang, et al.; "Collision Resolution in Packet Radio Networks Using Rotational Invariance Techniques;" IEEE Transactions on Communication; vol. 50; No. 1; Jan. 2002; pp. 146-155.
Zhang, et al.; "Optimized Multipath Network Coding in Loss Wireless Networks;" ICDCS '08 Proceedings of the 2008 The 28$^{th}$ International Conference on Distributing Computing Systems; Jan. 2008; 12 pages.
Zhang, et al.; "Dual XOR In the AIR: A Network Coding Based Retransmission Scheme for Wireless Broadcasting;" Communications (ICC) 2011 International Conference on Jun. 5-9, 2011; pp. 1-6.
Zhao, et al.; "A Multiqueue Service Room MAC Protocol for Wireless Networks With Multipacket Reception;" IEEE/ACM Transactions on Networking; vol. 11; No. 1; Feb. 2003; pp. 125-137.
Zhao, et al.; "On analyzing and improving COPE performance;" Information Theory and Applications Workshop (ITA), Jan. 2010; pp. 1-6.
Zhu, et al.; "Multicast with Network Coding in Application-Layer Overlay Networks;" IEEE Journal on Selected Areas in Communications; vol. 22; No. 1; Jan. 2004; pp. 1-13.
U.S. Appl. No. 14/882,115, filed Aug. 10, 2015, Lima et al.
U.S. Appl. No. 14/843,358, filed Sep. 2, 2015, Haupler et al.
U.S. Appl. No. 14/826,256, filed Aug. 14, 2015, Zeger, et al.
International Preliminary Report on Patentability of the ISA for PCT/US2014/026015 dated Sep. 15, 2015.
Calmon, et al.; "Lists that are smaller than their parts: A coding approach to tunable secrecy;" Allerton 2012; arXiv:1210.2126v1 [cs.IT]; Oct. 8, 2012; 8 pages.
Calmon, et al.; "Lists that are smaller than their parts: A coding approach to tunable secrecy;" Allerton 2012; RLE; Network Coding and Reliable Communications Group; Powerpoint Presentation; 46 pages.
Christiansen, et al.; "Brute forcing searching, the typical set and Guesswork;" Information Theory; arXiv:1301.6356v1 [cs.IT]; Jan. 27, 2013; 5 pages.
Wachter-Zeh; "Bounds on List Decoding of Rank-Metric Codes;" Universite De Rennes 1; Powerpoint Presentation; Sep. 18, 2013; 46 pages.
Ali, et al.; "Source Coding With Side Information using List Decoding;" 2010 IEEE International Symposium on Information Theory Proceedings (ISIT); IEEE; Jun. 2010; pp. 91-95.
Cai, et al.; "Theory of Secure Network Coding;" IEEE Proc. vol. 99; No. 3; pp. 421-437; Mar. 2011.
Cai, et al.; Secure Network Coding; IEEE International Symposium on Information Theory 2002; Jun. 30-Jul. 5, 2002; p. 323.
Elias; "List Decoding for Noisy Channels;" Research Laboratory of Electronics; MIT; Technical Report 335; Sep. 20, 1957; 14 pages.
Rouayheb, et al.; "Secure Network Coding for Wiretap Networks of Type II;" arXiv:0907.3493v1 [cs.IT]; Jul. 20, 2009; 21 pages.
Eschenauer, et al.; "A Key-Management Scheme for Distributed Sensor Networks;" Proceedings of the 9$^{th}$ ACM Conference on Computer and Communications Security, ser. CCS '02; ACM Nov. 18-22, 2002; pp. 41-47.
Feidman, et al.; "On the Capacity of Secure Network Coding:" Proc. 42$^{nd}$ Annual Allerton Conference on Communications, Control and Computing; Jan. 2004; 10 pages.
Forney; "Exponential Error Bounds for Erasure, List, and Decision Feedback Schemes;" IEEE Transactions on Information Theory; vol. IT-14; No. 2; Mar. 1968; pp. 206-220.
Guruswami; "Algorithmic Results in List Decoding;" Foundations and Trends in Theorectical Computer Science; vol. 2, No. 2; Jan. 2006; pp. 107-195.

(56) References Cited

OTHER PUBLICATIONS

Guruswami; "List decoding of binary codes (A brief survey of some recent results);" Coding and Cryptology, ser. Lecture Notes in Computer Science; Springer Berlin/Heidelberg; vol. 5557 Jan. 2009 pp. 97-106.
Guruswami; "List Decoding of Error-Correcting Codes;" Thesis, MIT; Cambridge, MA; Sep. 2001; 315 pages.
Katz, et al; "Introduction to Modern Cryptography;" Oct. 30, 2006; 327 pages.
Lima, et al.; "Random Linear Network Coding: A free cipher?;" IEEE International Symposium on Information Theory; Jun. 2007; pp. 546-550.
Mills, et al.; "On Secure Communication Over Wireless Erasure Networks;" IEEE International Symposium on Information Theory; Jul. 2008; pp. 161-165.
Oliveira, et al.; "Trusted Storage Over Untrusted Networks;" IEEE Global Telecommunications Conference; Dec. 2010; pp. 1-15.
Ozarow, et al.; "Wire-Tap Channel II:" Advances in Cryptology; EUROCRYPT '84, LNCS 209; Jan. 1985; pp. 33-50.
Shannon; "Communication Theory of Secrecy Systems;" Bell System Technical Journal; vol. 28; No. 4; pp. 656-715; Oct. 1949.
Shannon, et al.; "Lower Bounds to error Probablility for Coding on Discrete Memoryless Channels I;" Information and Control; vol. 10; No. 5; Feb. 1967; pp. 65-103.
Shannon, et al.; "Lower Bounds to error Probability for Coding on Discrete Memoryless Channels II;" Information and Control; vol. 10; Issue 5; May 1967; pp. 522-552.
Silva, et al.; "Universal Secure Network Coding via Rank-Metric Codes;" arXiv:0809.3546v2 [cs.IT]; Apr. 27, 2010; 12 pages.
Notification of Transmittal of the International Search Report and the Written Opinion of the International Searching Authority, or the Declaration, PCT/US2014/26015, dated Oct. 10, 2014, 12 pages.
Korean Notice of Rejection (with English Translation) dated Dec. 1, 2016 corresponding to Korean Application No. 10-2015-7029058; 13 Pages.
Japanese Notice of Rejection (with English Translation) dated Oct. 6, 2016 corresponding to Japanese Application No. 2016-502026; 6 Pages.
Calmon et al., "Lists that are Smaller than their Parts: A Coding Approach to Tunable Secrecy;" Proceedings of the IEEE 50$^{th}$ Allerton Conference on Communication, Control, and Computing; Oct. 2012; 8 Pages.
European Extended Search Report dated Oct. 10, 2016 for corresponding European Application No. 14772997.4; 4 Pages.
Dougherty et al., "Maximum Distance Separable Codes in the p Metric over Arbitrary Alphabets;" Journal of Algebraic Combinatorics, vol. 16; 2002; pp. 71-81; 11 Pages.

* cited by examiner

METHOD AND APPARATUS FOR SECURE COMMUNICATION

CROSS REFERENCE TO RELATED APPLICATIONS

This application claims the benefit under 35 U.S.C. § 119(e) of provisional application Ser. No. 61/783,708, entitled "LISTS THAT ARE SMALLER THAN THEIR PARTS: A NEW APPROACH TO SECRECY," filed Mar. 14, 2013 and also to provisional application Ser. No. 61/783,747, entitled "METHOD AND APPARATUS FOR PROVIDING A SECURE SYSTEM," filed Mar. 14, 2013, both applications are hereby incorporated herein by reference in their entireties.

STATEMENT REGARDING FEDERALLY SPONSORED RESEARCH

This invention was made with government support under Contract No. FA8721-05-C-0002 awarded by the U.S. Air Force. The government has certain rights in the invention.

FIELD

The subject matter described herein relates generally to communication systems and, more particularly, to systems and related techniques for enabling secure communications in communication networks.

BACKGROUND

As is known in the art, computationally secure cryptosystems, which are largely based upon unproven hardness assumptions, have led to cryptographic schemes that are widely adopted and thrive from both a theoretical and a practical perspective in communication systems. Such cryptographic schemes are used millions of times per day in applications ranging from online banking transactions to digital rights management. Increasing demands for large-scale high-speed data communications, for example, have made it important for communication systems to achieve efficient, reliable, and secure data transmissions.

As is also known, information-theoretic approaches to secure cryptosystems, particularly secrecy, are traditionally concerned with unconditionally secure systems, i.e. systems with schemes that manage to hide all bits of a message from an eavesdropper with unlimited computational resources available to intercept or decode a given message. It is well known, however, that in a noiseless setting unconditional secrecy (i.e., perfect secrecy) can only be attained when both a transmitting party and a receiving party share a random key with entropy at least as large as the message itself (see, e.g., "Communication Theory of Secrecy Systems," by C. E. Shannon, *Bell Systems Technical Journal*, vol. 28, no. 4, pp. 656-715, 1949). It is also well known that, in other cases, unconditional secrecy can be achieved by exploiting particular characteristics of a given scheme, such as when a transmitting party has a less noisy channel (e.g., wiretap channel) than an eavesdropper. (see, e.g., "Information Theoretic Security," by Liang et al., *Found. Trends Commun. Inf. Theory*, vol. 5, pp. 355-580, April 2009).

Traditional secrecy schemes, including secure network coding schemes and wiretap models, assume that an eavesdropper has incomplete access to information needed to intercept or decode a given data file. Wiretap channel II, for example, which was introduced by L. Ozarow and A. Wyner, is a wiretap model that assumes an eavesdropper observes a set k out of n transmitted symbols (see, e.g., "Wiretap Channel II," by Ozarow et al, *Advances in Cryptography,* 1985, pp. 33-50). Such wiretap model was shown to achieve perfect secrecy, but practical considerations limited its success. An improved version of Wiretap channel II was later developed by N. Cai and R. Yeung, which addressed a related problem of designing an information-theoretically secure linear network code when an eavesdropper can observe a certain number of edges in the network (see, e.g., "Secure Network Coding," by Cai et al., *IEEE International Symposium on Information Theory,* 2002).

A similar and more practical approach was later described in "Random Linear Network Coding: A Free Cipher?" by Lima at al. in *IEEE International Symposium on Information Theory*, June 2007, pp. 546-550. However, with an ever increasing amount of data being streamed over the internet and in both near and far-field communications, for example, there remains a need for new and more efficient methods and systems for use in providing secure communication in communications systems and networks. Additionally, there remains a need for characterizing and optimizing such secrecy schemes through improved information-theoretic metrics.

SUMMARY

The present disclosure provides secrecy scheme systems and associated methods for enabling secure communications in communications networks. Additionally, the present disclosure provides improved information-theoretic metrics for characterizing and optimizing said secrecy scheme systems and associated methods.

In accordance with one aspect of the present disclosure, a transmitting system for secure communication includes a receiver module operable to receive a data file at a first location; an encoder module coupled to the receiver module and operable to encode the data file using a list source code to generate an encoded data file; an encryption module coupled to one or more of the receiver module and encoder module and operable to encrypt a select portion of the data file using a key to generate an encrypted data file; and a transmitter module coupled to one or more of the encoder module and encryption module and operable to transmit the encoded data file and the encrypted data file to an end user at a destination location, wherein the encoded data file cannot be decoded at the destination location until the encrypted data file has been received and decrypted by the end user, wherein the end user possesses the key.

In accordance with another aspect of the present disclosure, the encoded data file of the transmitting system for secure communication is a unencrypted data file. In another aspect, the encrypted data file is an encoded encrypted data file.

In accordance with one aspect of the present disclosure, a receiving system for secure communication includes a receiver module operable to receive, at a destination location, one or more of an encoded data file, an encrypted data file, or a key from a first location; a decryption module coupled to the receiver module and operable to decrypt the encrypted data file using a key to generate a decrypted data file; and a decoder module coupled to one or more of the decryption module and the receiver module and operable to decode one or more of the encoded data file and the decrypted data file to generate an output data file.

In accordance with another aspect of the present disclosure, the encoded data file of the receiving system for secure communication is a unencrypted data file. In another aspect, the encrypted data file is an encoded encrypted data file. In another aspect, the output data file comprises a list of potential data files. In another aspect, the decoder module is further operable to determine a data file from the list of potential data files, wherein the data file is representative of the encoded data file in combination with the encrypted data file.

In accordance with one aspect of the present disclosure, a method of secure communication includes receiving a data file at a first location, encoding the data file using a list source code to generate an encoded file, encrypting a select portion of the data file using a key to generate an encrypted file, and transmitting the encoded file and the encrypted file to an end user at a destination location, wherein the encoded file cannot be decoded at the destination location until the encrypted file has been received and decrypted by the end user, wherein the end user possesses the key. In another aspect, a large portion of the encoded file is transmitted before the encrypted file and the key are transmitted to the end user.

In accordance with another aspect of the present disclosure, a method of secure communication also includes encrypting a select portion of the data file before, during, or after transmission of the encoded file. In another aspect, the method additionally includes transmitting the key to the destination location either before, during or after transmission of the encoded file to the destination location. In another aspect, the method further includes only needing to abort transmission of the encrypted file if the key is compromised during the transmission of the encoded file. In yet another aspect, security of the method is not compromised if the transmission of the encoded file is not aborted.

In accordance with yet another aspect of the present disclosure, the method is applied as an additional layer of security to an underlying encryption scheme. In another aspect, the method is tunable to a desired level of secrecy, wherein size of the key is dependent upon the desired level of secrecy, wherein said size can be used to tune the method to the desired level of secrecy.

BRIEF DESCRIPTION OF THE DRAWINGS

The foregoing features of the concepts, systems, circuits, and techniques described herein may be more fully understood from the following description of the drawings in which.

DETAILED DESCRIPTION

Figure 1:
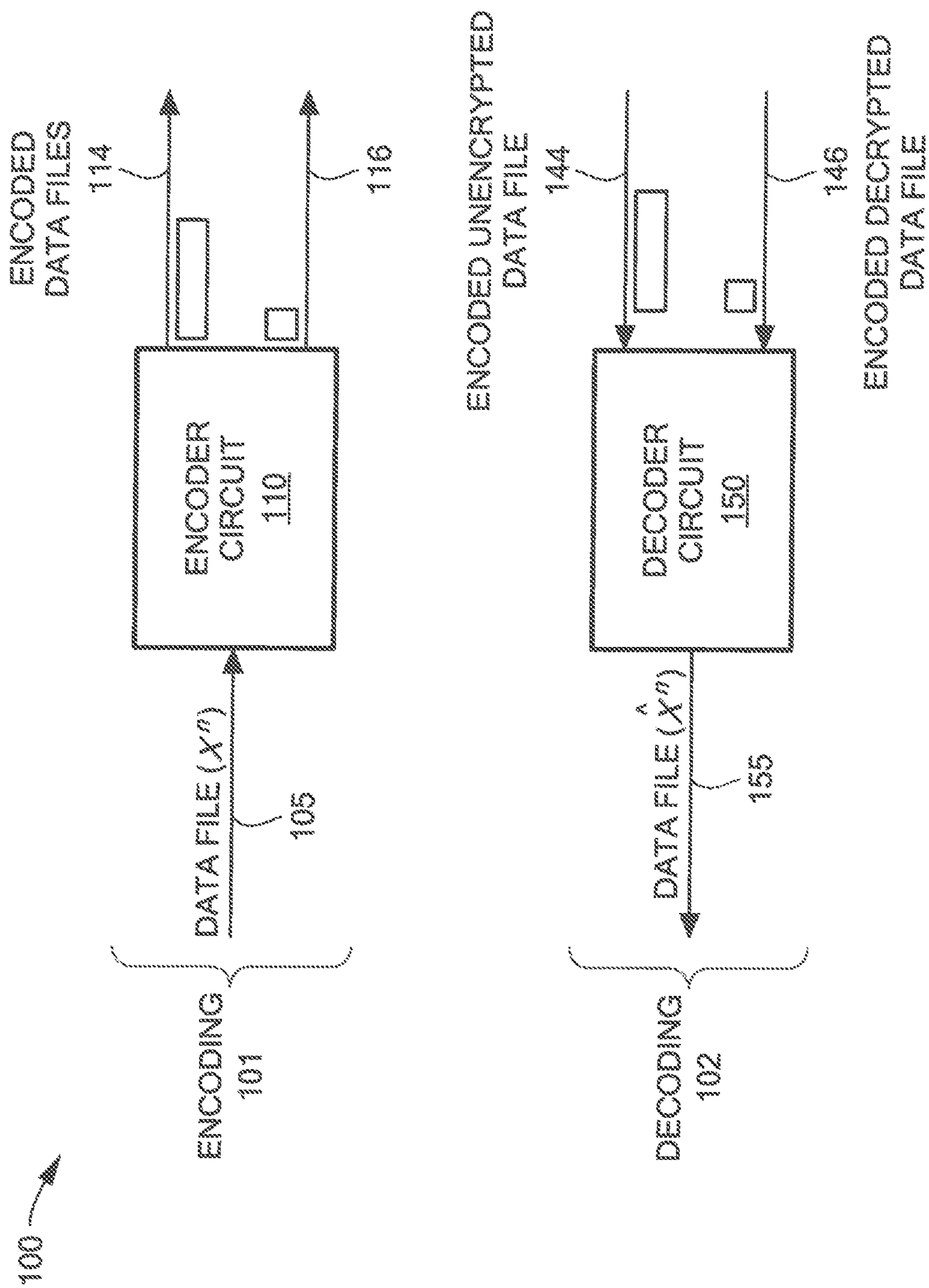
FIG. 1 is a block diagram of an example encoding and decoding system.

The features and other details of the disclosure will now be more particularly described. It will be understood that the specific embodiments described herein are shown by way of illustration and not as limitations of the broad concepts sought to be protected herein. The principal features of this disclosure can be employed in various embodiments without departing from the scope of the disclosure. The preferred embodiments of the present disclosure and its advantages are best understood by referring to FIGS. 1-7 of the drawings, like numerals being used for like and corresponding parts of the various drawings.

Definitions

For convenience, certain terms used in the specification and examples are collected here.

"Code" is defined herein to include a rule or set of rules for converting a piece of data (e.g., a letter, word, phrase, or other information) into another form or representation which may or may not necessarily be of the same type as the piece of data.

"Data file" is defined herein to include text or graphics material containing a representation of a collection of facts, concepts, instructions, or information to which meaning has been assigned, wherein the representation may be analog, digital, or any symbolic form suitable for storage, communication, interpretation, or processing by human or automatic means.

"Encoding" is defined herein to include a process of applying a particular set of coding rules to readable data (e.g., a plain-text data file) for converting the readable data into another format (e.g., adding redundancy to the readable data or transforming the readable data into indecipherable data). The process of encoding may be performed by an "encoder." An encoder converts data from one format or code to another, for the purposes of reliability, error correction, standardization, speed, secrecy, security, and/or saving space. An encoder may be implemented as a device, circuit, process, processor, processing system or other system. "Decoding" is a reciprocal process of "encoding," with a "decoder" performing a reciprocal process of an "encoder." A decoder may be implemented as a device, circuit process, processor, processing system or other system.

"Encryption" is defined herein to include a process of converting readable data (e.g., a plain-text data file) into indecipherable data (e.g., cipher-text), wherein the conversion is based upon an encoding key. Encryption can encompass both enciphering and encoding. "Decryption" is a reciprocal process of "encryption," involving restoring the indecipherable data into readable data. The process requires not only knowledge of a corresponding decryption algorithm but also knowledge of a decoding key, which is based upon or substantially the same as the encoding key.

"Independent and Identically Distributed (i.i.d.) source" is defined herein to include a source comprising random variables $X_1, \ldots, X_n$ where $P_{X1, \ldots, Xn}(x1, \ldots, xn)=P_{x(X1)} P_{x(X2)} \ldots P_{x(Xn)}$ for a discrete source and $f_{X1, \ldots, Xn}(x1, \ldots, xn)=f_{x(X1)} f_{x(X2)} \ldots f_{x(Xn)}$ for a continuous source.

"Linear code" is defined herein to include a code for which any linear combination of codewords is also a codeword.

"List source code" is defined herein to include codes that compress a source sequence below its entropy rate and are decoded to a list of possible source sequences instead of a unique source sequence.

"Modulation" is defined herein to include a process of converting a discrete data signal (e.g., readable data, indecipherable data) into a continuous time analog signal for transmission through a physical channel (e.g., communication channel). "Demodulation" is a reciprocal process of "modulation," converting a modulated signal back into its original discrete form. "Modulation and coding scheme (MCS)" is defined herein to include the determining of coding method, modulation type, number of spatial streams, and other physical attributes for transmission from a transmitter to a receiver.

Referring now to FIG. 1, an exemplary system 100 includes an encoding system 101 and a decoding system 102. System 100 may be used with the embodiments disclosed herein, e.g., to encode and decode data. The encoding system 101 comprises an encoder circuit 110 configured to receive a data file (X″) 105 at an input thereof and configured to encode the data file (X″) 105 and generate one or more encoded data files 114,116 at an output thereof. Encoded data files 114,116 may, for example, comprise a smaller encoded file and a larger encoded file, wherein the smaller encoded file is to be later encrypted. Conversely, the decoding system 102 comprises a decoder circuit 150 configured to receive an encoded unencrypted data file 144 and an encoded decrypted data file 146 at an input thereof and configured to decode data file ($\widehat{X''}$) 155 at an output thereof from the encoded unencrypted data file 144 and the encoded decrypted data file 146.

It is to be appreciated that the encoder circuit 110 and/or the decoder circuit 150 may be embodied as hardware, software, firmware, or any combination thereof. For instance, one or more memories and processors may be configured to store and execute, respectively, various software programs or modules to perform the various functions encoding and/or decoding techniques described herein. For example, in certain embodiments, the coding system may be implemented in a field-programmable gate array (FPGA), and may be capable of achieving successful communication for high data rates. Alternatively, coding system may be implemented via an application specific integrated circuit (ASIC) or a digital signal processor (DSP) circuit or via another type of processor or processing device or system.

Figures 2A, 2B:
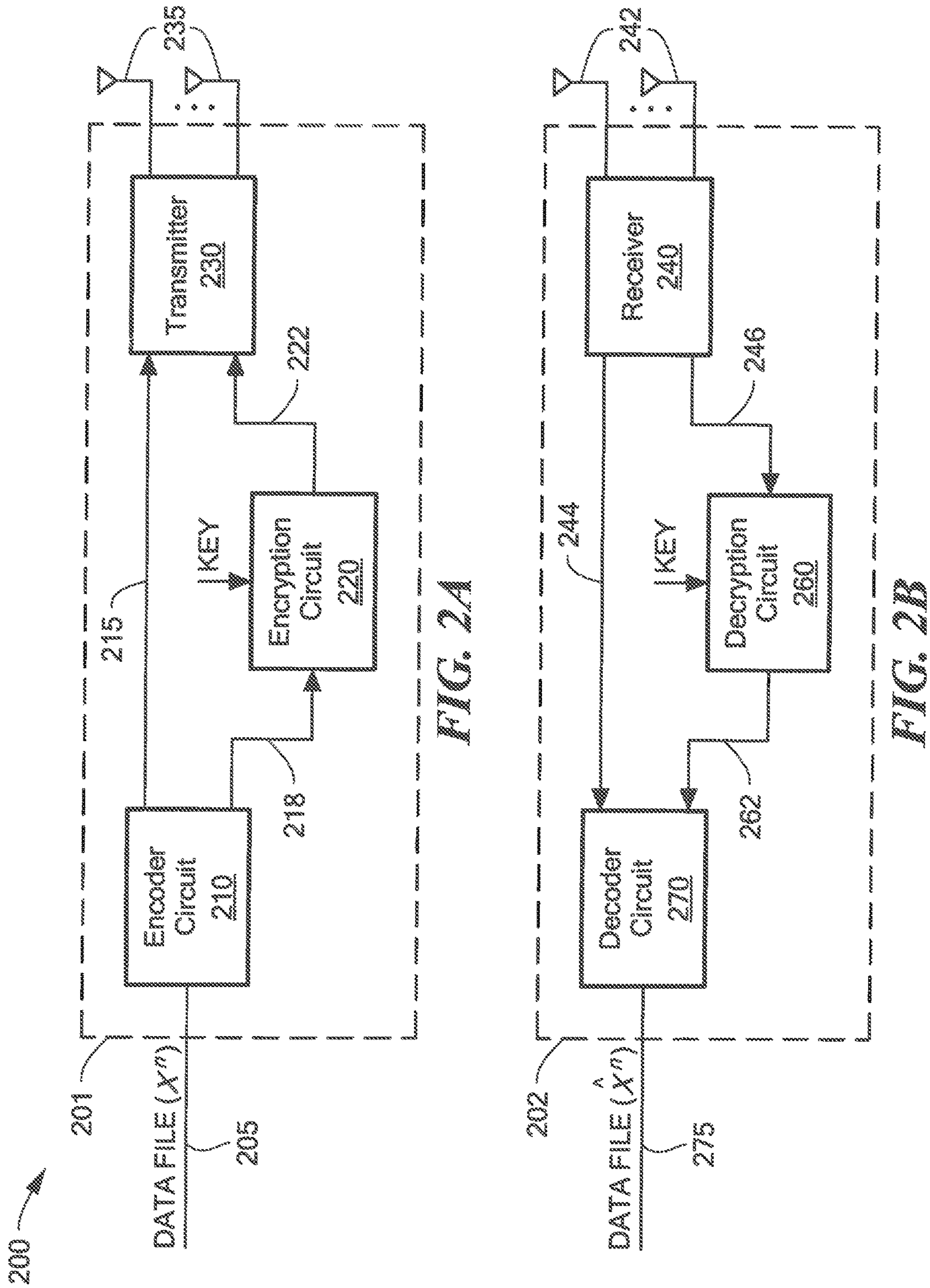
FIGS. 2A and 2B are block diagrams of an example system comprising a modulator system and demodulator system, respectively.

Referring now to FIGS. 2A and 2B, an exemplary modulator and demodulator system, collectively system 200 (e.g., an expansion of system 100 above) comprises a modulator system 201, shown in FIG. 2A, and a demodulator system 202, shown in FIG. 2B.

Referring now to FIG. 2A, the modulator system 201 comprises an encoder circuit 210, an encryption circuit 220, and a transmitter 230, wherein the encoder circuit 210 may be the same as or similar to encoder circuit 110 of FIG. 1. Referring briefly to FIG. 2B, the demodulator system 202 comprises a decoder circuit 270, a decryption circuit 260, and a receiver 240, wherein the decoder circuit 270 may be the same as or similar to decoder circuit 150 of FIG. 1. Transmitter 230 and receiver 240 can be coupled to antennas 235 and 242, or some other type of transducers, to provide a transition to free space or other transmission medium. In some embodiments, the antennas 235, 242 may each include a plurality of antennas, such as those used in multiple-input multiple-output (MIMO) systems. Such an approach may, for example, improve capacity of system 200, i.e., maximize bits/second/hertz as compared to single antenna implementations. The receiver 240 can be an end user at a destination location, with the destination location being a remote location according to some embodiments and the same as a first location of the transmitter 230 according to other embodiments.

Returning now to FIG. 2A, the modulator system 201 is coupled to receive a data file (X″) 205, which can be the same as or similar to data file (X″) 105 of FIG. 1, at an input thereof. In particular, the data file (X″) 205 is received at an input of the encoder circuit 210. The encoder circuit 210 is configured to encode the data file (X″) 205 in accordance with a particular encoding process using a list source code (e.g., with particular reference to FIG. 5) to generate a plurality of encoded data files 215, 218 at an output thereof. A first encoded data file 215, which comprises encoded unencrypted data, is provided to an input of transmitter 230 for transmission. A second encoded data file 218, which according to a preferred embodiment is substantially smaller than the first encoded data file 215, is provided to an input of the encryption circuit 220. The encryption circuit 220 is configured to encrypt the second encoded data file 218 in accordance with a particular encryption process using a key (e.g., with particular reference to FIG. 5) to generate an encoded encrypted data file 222 at an output thereof, wherein the key controls the encryption and decryption of the data file (X″) 205. The transmitter 230 is configured to receive the first encoded data file 215 and the encoded encrypted data file 222 as inputs and transmit the data files 215, 222, in addition to the key, to a receiver, which can be receiver 240 of demodulator system 202 of FIG. 2B.

Referring now to FIG. 2B, the receiver 240 is coupled to receive an encoded unencrypted data file 244, an encoded encrypted data file 246, and a key as inputs, wherein the inputs can be the same as or similar to the first encoded data file 215, the encoded encrypted data file 222 and the key of the modulator system 201. The receiver 240 is configured to deliver the encoded unencrypted data file 244, encoded encrypted data file 246, and key to the decoder circuit 270 and decryption circuit 260, respectively. The decryption circuit 260 is configured to decrypt encoded encrypted data file 246 with the key and generate an encoded decrypted data file 262 at an output thereof. The decoder circuit 270 is coupled to receive the encoded decrypted data file 262, with the decoder circuit 270 configured to decode the encoded decrypted data file 262 and the encoded unencrypted data file 244 into a data file ($\widehat{X''}$) 275, as will be further discussed in conjunction with FIG. 6. In some embodiments, the decoder circuit 270 is configured to decode the encoded decrypted data file 262 and the encoded unencrypted data file 244 into a list of potential list source codes and extract a data file ($\widehat{X''}$) 275 from the list of potential list source codes.

In an alternative embodiment (not shown), the data file (X″) 205 can be received at inputs of an encoder circuit and an encryption circuit. The encoder circuit can be configured to encode the data file (X″) 205 in accordance with a particular encoding process using a list source code to generate an encoded file at an output thereof. The encryption circuit, on the other hand, can be configured to encrypt a select portion of the data file (X″) 205 in accordance with a particular encryption process using a key to generate an encrypted file at an output thereof, wherein the key controls the encryption and decryption of the data file (X″) 205. A transmitter can be configured to receive the encoded file and the encrypted file as inputs and transmit the files in addition to the key, to a receiver, which can be receiver 240 of demodulator system 202 of FIG. 2B.

Figure 3:
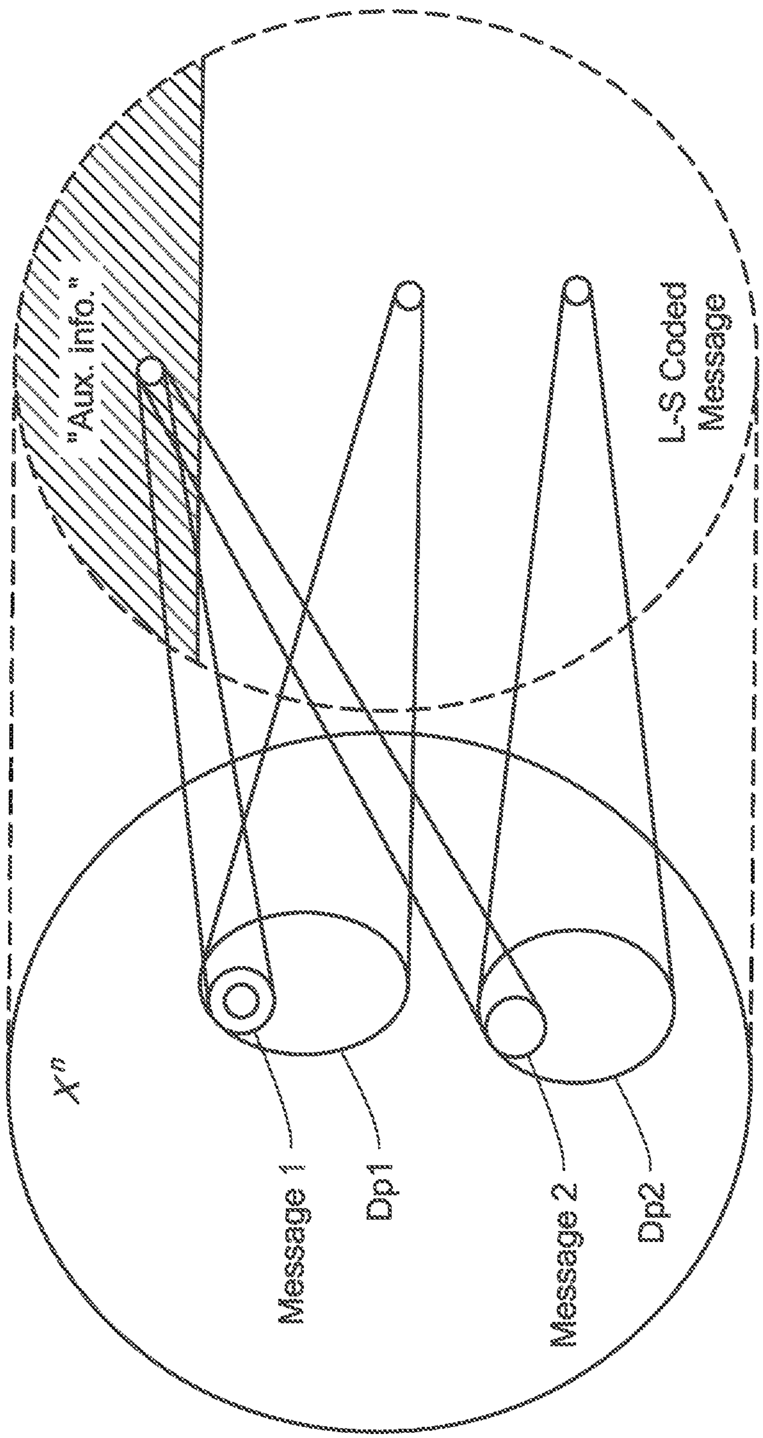
FIG. 3 is a diagram illustrating an example data file (X″) and an associated list source code.

Referring now to FIG. 3, a diagram illustrating an example data file (X″) and an associated list source code is shown. The data file (X″) comprises a plurality of data packets (with only two data packets Dp1, Dp2, (being illustrated in FIG. 3) each of which comprises one or more data segments, denoted by Message 1 and Message 2, for example. Select data segments (Message 1, Message 2) are encrypted using a key (e.g., with particular reference to FIG. 5) that is smaller than the list source code, as indicated by "Aux. info." The list source code, in some embodiments, can be implemented using standard linear codes. A linear code C, for example, can be represented as a linear subspace of $F_2^n$, composed of elements $\{0,1\}^n$. For every linear code C, there exists a parity check matrix H and a generator matrix G which satisfy $C=\{x \in F_2^n: H_x=0\}$ and $C=\{G_y: y \in \{0,1\}^m\}$. As illustrated, the key (denoted as "Aux. info." In FIG. 3) is representative of only a fraction of the list source code. List source codes are key-independent, which allows content to be distributed when a key distribution infrastructure is not yet established.

As explained above in the Definitions section, a list source code includes codes that compress a source sequence below its entropy rate and are decoded to a list of possible source sequences instead of a unique source sequence. More detailed definitions and embodiments of list source codes and their fundamental bounds are provided herein.

In particular, a $(2^{nR}, |X|^{nL}, n)$-list source code for a discrete memory-less source X comprises an encoding function $f_n$: $X^n \to \{1, \ldots, 2^{nR}\}$ and a list-decoding function $g_n$: $\{1, \ldots, 2^{nR}\} \to P(X^n)/\emptyset$, where $P(X^n)$ is a power set (i.e., collection of all subsets) of $X^n$ and $|g(w)|=|X|^{nL}$ $\forall w \in \{1, \ldots, 2^{nR}\}$, and where L is a parameter that determines the size of a decoded list, with $0 \le L \le 1$. A value of L=0, for example, corresponds to a traditional lossless compression, i.e., each source sequence is decoded to a unique sequence. On the other hand, a value of L=1 represents the trivial case when a decoded list corresponds $X^n$.

An error results for a given list source code when a string generated by a source is not contained in a corresponding decoded list. The average probability of the error is given by:

$$e_L(f_n,g_n)=Pr(X^n \notin g_n(f_n(X^n))).$$

Additionally, for a given discrete memory-less source X, a rate list size pair (R, L) is said to be achievable if for every $\delta>0$, $0<\epsilon<1$ and sufficiently large n there exists a sequence of $(2^{nR_n}, |X|^{nL_n}, n)$-list source codes $(f_n, g_n)$ such that $R_n<R+\delta$, $|L_n-L|<\delta$ and $e_{L_n}(f_n, g_n)\le\epsilon$. A closure of all rate list pairs (R, L) is defined as a rate list region.

Figure 4:
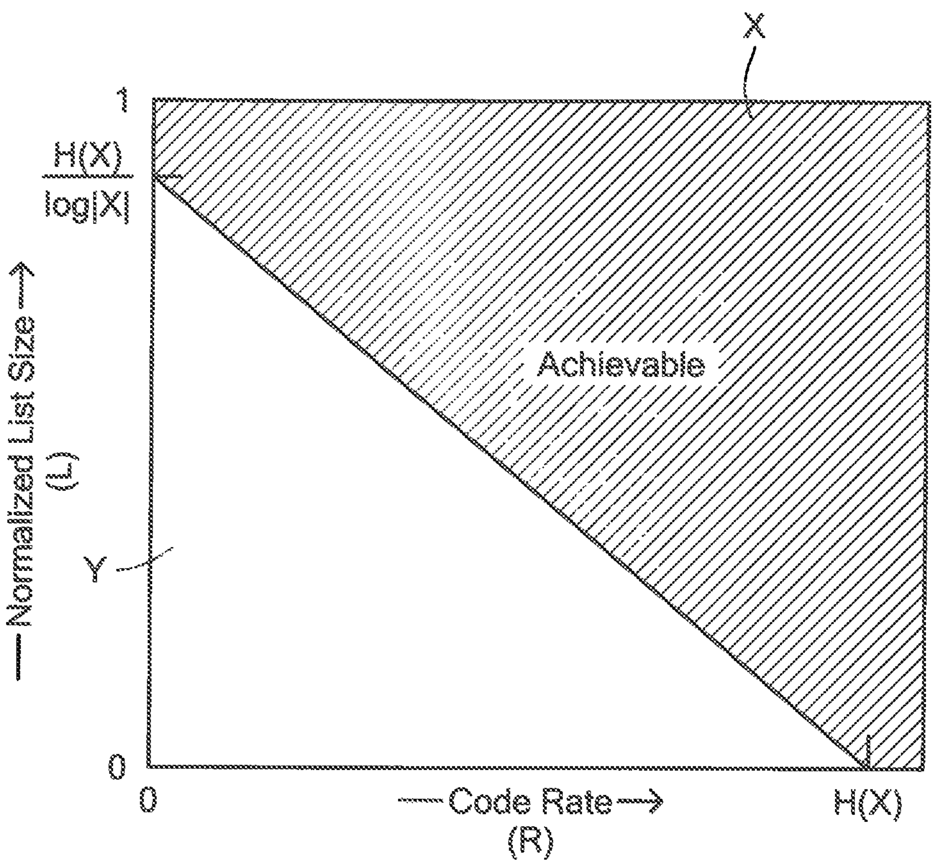
FIG. 4 is a plot of an example rate list region for a given normalized list and code rate.

Referring now to FIG. 4, shown is a plot of an example rate list region for a given normalized list size L and a code rate R. A rate list function R(L) is representative of an infimum (i.e., greatest lower bound) of all rates R such that (R, L) is in a rate list region for a given normalized list size $0\le L\le 1$. For any discrete memory-less source X, the rate list function R(L) is bounded by $R(L)\ge H(X)-L \log|X|$.

For example, with $\delta>0$ and $(f_n, g_n)$ a sequence of codes with a normalized list size $L_n$ such that $L_n\to L$, $0<\epsilon<1$, and n is given by $0\le e_L(f_n, g_n)\le\epsilon$, then $$\underbrace{Pr\left[X^n \in \bigcup_{w\in W^n} g_n(w)\right] \ge Pr[X^n \in g_n(f_n(X^n))]}_{\ge 1-\epsilon}$$

where $W^n=\{1, \ldots, 2^{nR_n}\}$ and $R_n$ is the rate of the code $(f_n, g_n)$.

$$\frac{1}{n}\log\left(\sum_{w\in W^n} |g_n(w)|\right) = \frac{1}{n}\log(2^{nR_n}|X|^{nL_n})$$

-continued $$= R_n + L_n\log|X| \ge \frac{1}{n}\log\left|\bigcup_{w\in W^n} g_n(w)\right| \ge H(X)-\delta$$

if $n\ge n_0(\delta, \epsilon, |X|)$. With the above holding any $\delta>0$, it follows that $R(L)\ge H(X)-L\log|X|$ for all n given by $0\le e_L(f_n, g_n)\le\epsilon$.

A rate list function R(L) bounded by $R(L)\ge H(X)-L\log|X|$ can be achieved in accordance with multiple schemes. In a conventional scheme, for example, with a source X uniformly distributed in Fq, i.e., $Pr(X=x)=1/q$ $\forall x\in Fq$, $R(L)=(1-L)\log q$. The rate list function R(L) can be achieved with a data file $X^n=(X^p, X^s)$, where $X^p$ denotes a first $p=n-[Ln]$ symbols of data file $(X^n)$ and $X^s$ denotes the last $s=[Ln]$ symbols of data file $(X^n)$, respectively. The data file $(X^n)$ can be encoded, for example, by discarding $X^s$ and mapping prefix of $X^p$ to a binary codeword $Y^{nr}$ of length $nR=[n-[Ln] \log q]$ bits. Additionally, the data file $(X^n)$ can be decoded, for example, by mapping binary codeword $Y^{nr}$ to $X^p$. In doing so, a list of size $q^s$, composed by $X^p$, is computed with all possible combinations of suffixes of length s. It will be apparent that optimal list-source size is achieved with n sufficiently large and $R\sim=[n-[Ln] \log q]$.

The conventional scheme, although substantially capable of achieving a rate list function R(L) bounded by $R(L)\ge H(X)-L\log|X|$, is largely inadequate for highly secure applications. In particular, an eavesdropper that observes a binary codeword $Y^{nR}$ can uniquely identify a first coset of source p symbols of an encoded source with uncertainty being concentrated over the last s sequential symbols. Ideally, assuming that all source symbols are of equal importance, uncertainty should be spread over all symbols of the encoded source. More specifically, for a given encoding function $f(X^n)$, an optimal security scheme would provide an uncertainty no greater than $I(X_i; f(X^n))\le\epsilon<<\log q$ for $1\le i\le n$. An improved scheme, which is an asymptotically optimal scheme based upon linear codes that substantially achieves the uncertainty of the optimal security scheme, will be discussed in conjunction with process 500 of FIG. 5.

Figure 5:
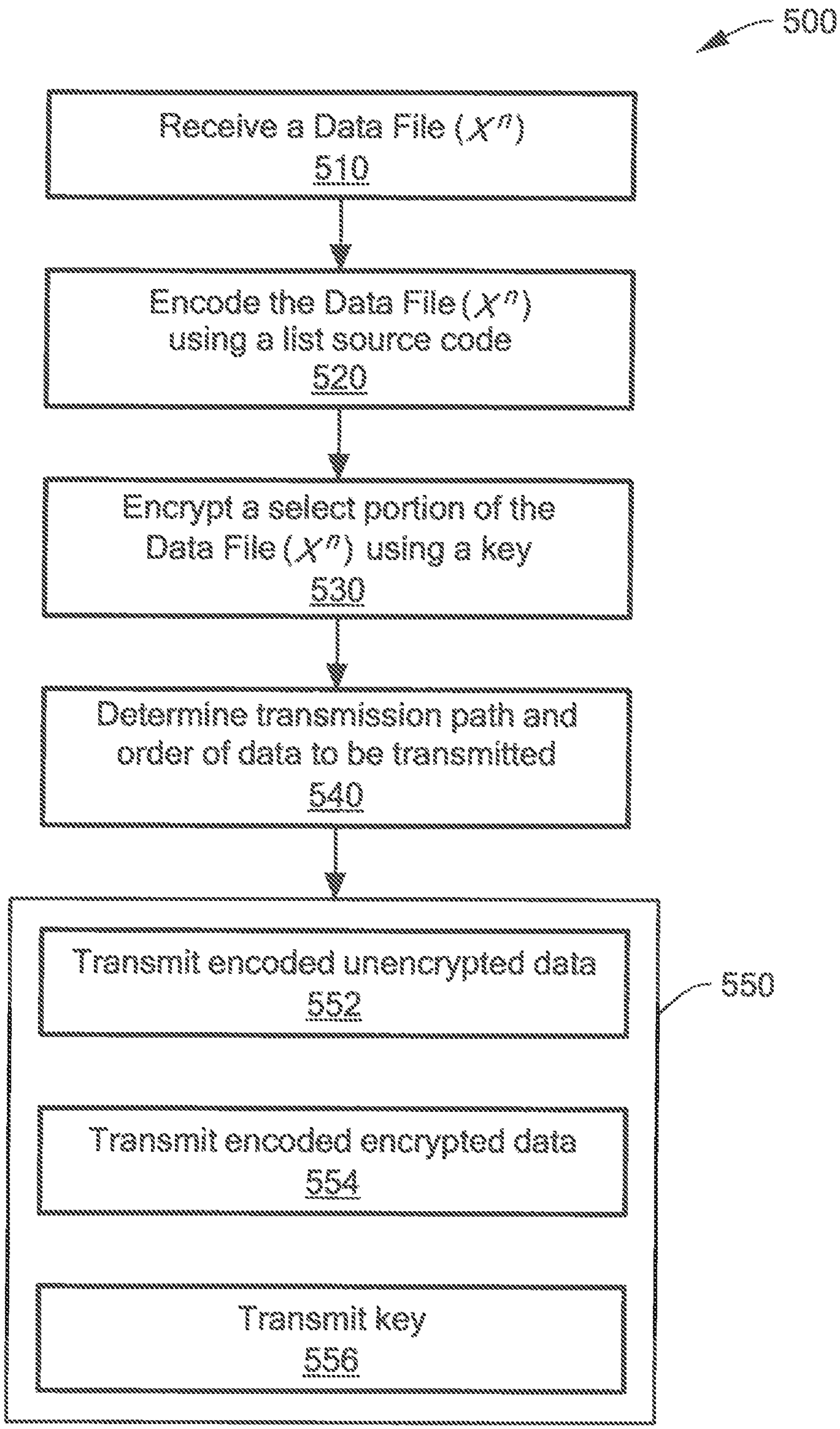
FIG. 5 is a flow diagram which illustrates an exemplary process for secure encoding and encryption according to an embodiment of the disclosure.

Referring now to FIG. 5, shown in an example encoding, encryption, and transmission process 500 according to the list source code techniques described above. A process 500 begins at processing block 510, where a modulator system, which can be the same as or similar to modulator system 201 of FIG. 2A, receives a data file $(X^n)$.

In processing block 520, the modulator system encodes the data file $(X^n)$ in an encoder, like encoder circuit 210 of FIG. 2A, using a list source code. In some embodiments, encoding the data file $(X^n)$ using the list source code includes encoding the data file $(X^n)$ with a linear code. In other embodiments, the list source code is a code that compresses a source sequence below its entropy rate.

The improved scheme, referred to briefly above in FIG. 4, is herein discussed further. In particular, X is an independent and identically distributed (i.i.d.) source (i.e., elements in the source sequence are independent of the random variables that came before it) with $X\in X$ with entropy H(X), and $S_n$ is a source code with an encoder $s_n$: $X^n\to F_q^{m_n}$ and a decoder $r_n$: $F_q^{m_n}\to X^n$, wherein $X^n$ is the data file. Additionally, C is a $(m_n, k_n, d)$ linear code over $F_q$ with an $(m_n-k_n)\times m_n$ parity check matrix $H_n$ (i.e. $c\in C \Leftrightarrow H_nc=0$). Furthermore, $k_n=nL_n \log|X|/\log q$ for $0\le L_n\le 1$, $L_n\to L$ as $n\to\infty$, and $k_n$ is an integer according to some embodiments.

The improved scheme comprises an encoding process, wherein data file $X^n$ is a sequence generated by a source with syndrome $S^{m_n}=H_n s_n(X^n)$. In particular, each syndrome $S^{m_n}=H_n s_n(X^n)$ is mapped to a distinct sequence of $nR=[(m_n-k_n)\log q]$ bits, denoted by $Y^{nR}$. The improved scheme also comprises a decoding process, which will be discussed further in conjunction with process 600 of FIG. 6. Using the encoding, the improved scheme has been shown to achieve an optimal list-source tradeoff point R(L) for an i.i.d. source, where R is an ideal rate list function when $S_n$ is asymptotically optimal for a given source X, i.e., $m_n/n \rightarrow H(X)/\log q$.

In particular, with (1) a size of each coset corresponding to a syndrome $S^{m_n-k_n}$, where $S^{m_n-k_n}$ is exactly $q^n$, (2) a normalized list size $L_n$ given by $L_n=(k_n \log q)/(n \log|X|) \rightarrow L$, and (3) $m_n/n=H(X)/\log q+\delta_n$, where $\delta_n \rightarrow 0$, it follows that (4) $R=[(m_n-k_n)\log q]/n=[(H(X)+\delta_n \log q)n-L_n n \log|X|]/n$. The aforementioned has been shown to achieve a rate list function R(L) that is bounded substantially close to $R(L) \geq H(X)-L \log|X|$ for a sufficiently large n. It is notable that if source X is uniform and without loss, where $L_n=L$ and $L_n$ is an integer, substantially any message in the coset of C determined by $S^{(1-L)n}$ of the improved scheme is equally likely. As such, $H(X^n|S^{(1-L)n})$ will be equal to $q^{Ln}$.

Accordingly, the improved scheme provides a systematic way of hiding information, specifically taking advantage of properties of an underlying linear code to make precise assertions regarding "information leakage" of the scheme.

In an embodiment, a plurality of encoded data files is generated in processing block 520. In this embodiment, as described above in FIG. 2A, a first encoded data file (i.e., encoded unencrypted data) is provided to an input of a transmitter, while a second encoded data file is provided to an input of an encryption circuit for encryption (processing block 530). The second encoded data file is ideally substantially smaller than the first encoded data file. In an alternative embodiment, a single encoded data file is generated in processing block 520.

In processing block 530, the modulator system encrypts a select portion of the data file ($X^n$) using a key to generate encoded encrypted data. As discussed above in conjunction with FIG. 3, the select portion of the data file ($X^n$), specifically data segments (e.g., Message 1, Message 2 of FIG. 3) is, in a preferred embodiment, encrypted with a key that is smaller than the list source code. It is to be appreciated that the process of encrypting a select portion of the data file ($X^n$) can occur before, during, or after transmission of the encoded unencrypted data in a processing block 550, as will become more apparent below. As noted in the discussions related to FIG. 2A, the select portion of the data file ($X^n$) to be encrypted may be received from an encoder circuit (like encoder circuit 210) or directly (in the alternative embodiment). In one embodiment, the select portion of the data file ($X^n$) encrypted is smaller than the encoded unencrypted data generated in processing block 520.

Various approaches may be used for selecting the portion of the file to be encrypted. In one approach, for example, a portion of the file that has been deemed private may be encrypted. In another approach, a combination of messages may be encrypted. In still another approach, the file may be encrypted as a whole. A further approach includes encrypting a function of the original file, rather than just a segment (e.g. the hash of the file, coded versions of the file, etc.). Other strategies for selecting the portion of the file to be encrypted may alternatively be used.

In processing block 540, the modulator system determines a transmission path and order of the data (i.e., encoded unencrypted data, encoded encrypted data, and key) to be transmitted.

In processing block 550, the modulator system transmits the encoded unencrypted data, the encoded encrypted data, and optionally the key to a receiver (e.g., end user) at a destination location, wherein the receiver may be the same as or similar to demodulator system 202 of FIG. 2B. In one approach, a substantial portion of the encoded unencrypted data is transmitted before the encoded encrypted data and the key are transmitted to the receiver. In some embodiments, the encoded unencrypted data cannot be decoded at the destination location until the encoded encrypted data has been received and decrypted by the receiver, wherein the receiver possesses the key. In other embodiments, the key is transmitted to the receiver before, during, or after transmission of the encoded unencrypted data to the receiver. In some embodiments, if the key is compromised during transmission of the encoded unencrypted data, only the transmission of the encoded encrypted data needs to be aborted. In particular, security of process 500 is not compromised if the transmission of the encoded unencrypted data is not aborted.

In alternative embodiments, the encoding and transmission process 500 of FIG. 5 is applied as an additional layer of security to an underlying encryption scheme. In yet other embodiments, process 500 may be implemented as a two-phase secure communication scheme which, in one embodiment, uses list source code constructions derived from linear codes. The two-phase secure communication scheme can, however, be extended to substantially any list source code by using corresponding encoding/decoding functions in lieu of multiplication by parity check matrices.

In one embodiment of the two-phase secure communication scheme, it is assumed that a transmitter, which can be the same of or similar to transmitter 230 of modulator system 201 of FIG. 2A, and a receiver, which can be the same as or similar to receiver 240 of demodulator system 202 of FIG. 2B, have access to an encryption/decryption scheme (Enc', Dec'). The encryption/decryption scheme (Enc', Dec') is used in conjunction with a key, wherein the encryption/decryption scheme (Enc', Dec') and the key are sufficiently secure against an eavesdropper. This embodiment can be, for example, a one-time pad.

In a first (pre-caching) phase (hereinafter denoted "phase I") of the two-phase secure communication scheme, which can occur in a modulation system, the transmitter receives one or more of the following as inputs: (1) a source encoded sequence $X^n \in F_q^n$, (2) parity check matrix H of a linear code in $F_q^n$, (3) a full-rank k×n matrix D such that rank $([H^T\ D^T])=n$, and (4) encryption/decryption functions (Enc', Dec'). From the inputs, the transmitter is configured to generate $S^{n-k}=HX^n$ of an output thereof and transmit the output to the receiver, while maintaining a level of secrecy determined by an underlying list source code. List source codes provide a secure mechanism for content pre-caching when a key infrastructure has not yet been established. In particular, a large fraction of a data file can be list source coded and securely transmitted before termination of a key distribution protocol. Such is particularly useful in large networks with hundreds of mobile nodes, where key management protocols can require a significant amount of time to complete.

In a second (encryption) phase (hereinafter denoted "phase II") of the two-phase secure communication scheme, which can also occur in a modulator system, the transmitter is configured to generate $E^k$=Enc'($DX^n$, K) from the inputs of phase I at an output thereof and transmits the output to the receiver.

In a receiving phase, which can occur in a demodulation system, the receiver is configured to compute $DX^n$=Dec'($E^k$) and recover data file ($X^n$) from $S^{n-k}$ and $DX^n$. Assuming that (Enc', Dec') is secure, the above two-phase secure communication scheme actually reduces security of an underlying list source code. In practice, however, the effectiveness of the encryption/decryption functions (Enc', Dec') may depend on the key, wherein the key provides sufficient security for a desired application. Additionally, assuming that a data file ($X^n$) is uniform and i.i.d. in $F_q^n$, Maximum Distance Separable (MDS) codes (i.e., linear [n, k]q-ary (n,M,d)-codes where $M \leq q^{n-d+1}$; $q^k \leq q^{n-d+1}$; and $d \leq n-k+1$) can be used to make strong security guarantees. In such case, an eavesdropper that observes $S^{n-k}$ cannot infer any information concerning any sets of k symbols of the data file ($X^n$).

Even if the key were compromised before phase II of the two-phase secure communication scheme, the data file ($X^n$) is still as secure as the underlying list source code. Assuming a computationally unbounded eavesdropper has perfect knowledge of the key, the best the eavesdropper can do is to reduce a number of possible data file ($X^n$) inputs to an exponentially large list until the last part of the data file is transmitted. As such, the two-phase secure communication scheme provides an information-theoretic level of security to the data file ($X^n$) up to the point where the last fraction of the data file ($X^n$), particularly the encoded unencrypted data and the encoded encrypted data, is transmitted. Additionally, if the key is compromised before phase II of the two-phase secure communication scheme, the key can be redistributed without retransmitting the entire encoded unencrypted data and the encoded encrypted data. In one embodiment, as soon as a key is reestablished, the transmitter can simply encrypt a remaining portion of the data file ($X^n$) in phase II of the two-phase secure communication scheme with a new key.

In contrast, if an initial seed is leaked to an eavesdropper in a conventional scheme (e.g., stream cipher based on a pseudo-random number generator), all portions of the data file ($X^n$) transmitted up until when the eavesdropper is detected are vulnerable.

In other embodiments, process 500, in conjunction with the two-phase secure communication scheme, may comprise a tunable level of secrecy wherein size of the key is dependent upon a desired level of secrecy, wherein the size can be used to tune process 500 to the desired level of secrecy. In particular, an amount of data sent in phase I and phase II can be appropriately selected to match properties of an available encryption scheme, the key size, and a desired level of secrecy. Additionally, list source codes can be used to reduce a total number of operations required by the two-phase secure communication scheme by allowing encryption of a smaller portion of the message in phase II, specifically when an encryption procedure has a higher computational cost than the list-source encoding/decoding operations. In one embodiment, list source codes are used to provide a tunable level of secrecy by appropriately selecting a size of a list (L) of an underlying code, with the selection being used to determine an amount of uncertainty an adversary can have regarding a data file ($X^n$). In the two-phase secure communication scheme, a larger value of L can lead to a smaller list source coded data file ($X^n$) in phase I and a larger encryption burden in phase II of the scheme.

In yet other embodiments, list source codes can be combined with stream ciphers in the two-phase secure communication scheme. A data file ($X^n$), for example, can be initially encrypted using a pseudorandom number generator initialized with a randomly selected seed and then list source coded. The initial randomly selected seed can also be part of the encoded encrypted data in a transmission phase of the two-phase secure communication scheme. The arrangement has an advantage of augmenting security of an underlying stream cipher in addition to providing randomization to the list source coded data file ($X^n$).

Figure 6:
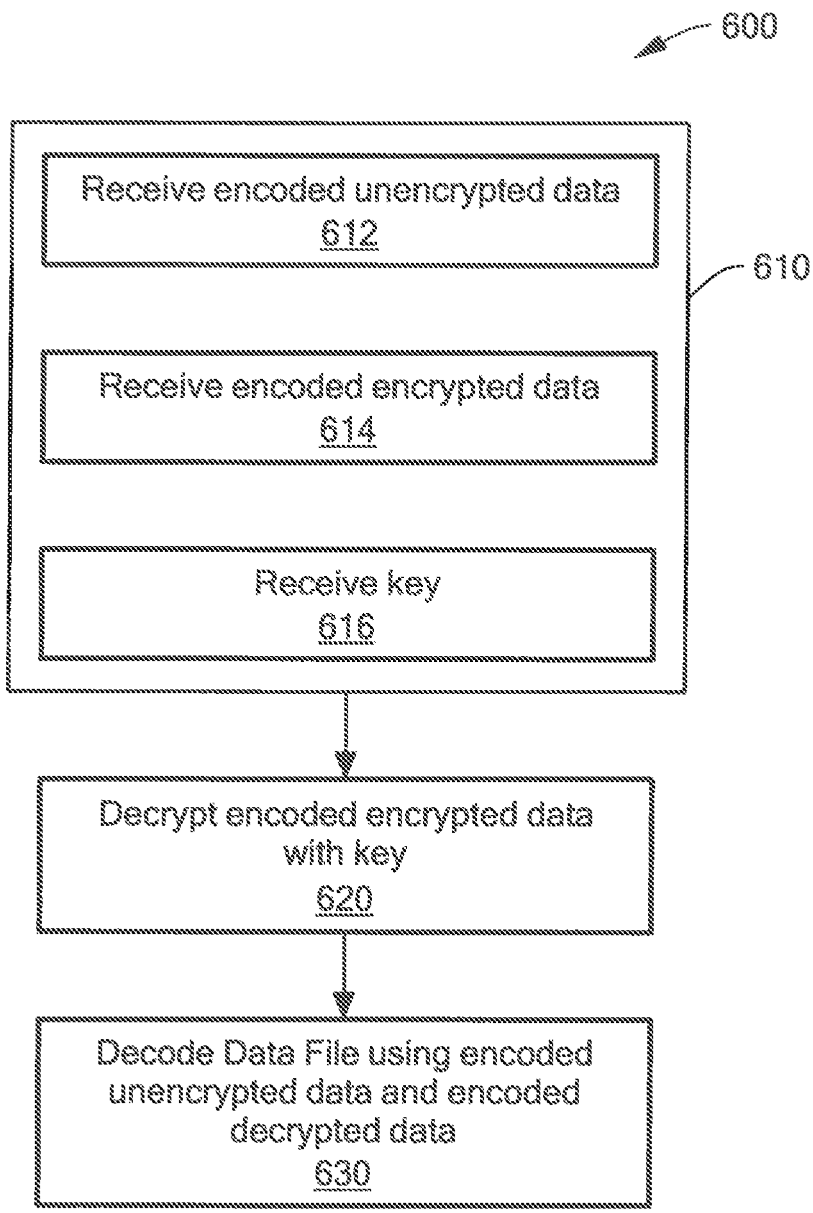
FIG. 6 is a flow diagram which illustrates an exemplary process for secure decoding and decryption according to an embodiment of the disclosure.

Referring now to FIG. 6, shown in an example receiving, decoding and decryption process 600 according to the list source code techniques described herein. A process 600 begins at processing block 610, where a demodulator system, which can be the same as or similar to demodulator system 202 of FIG. 2B, receives encoded unencrypted data 612, encoded encrypted data 614, and a key 616, which can be the same as or similar to the encoded unencrypted data, the encoded encrypted data, and the key from encoding and encryption process 500 of FIG. 5, from a modulator system, which can be the same as or similar to modulator system 201 of FIG. 2A. It is to be appreciated that the process of receiving the encoded unencrypted data 612, encoded encrypted data 614, and key need not occur in any particular order. However, as mentioned above in conjunction with process 500 of FIG. 5, in one embodiment a large portion of the encoded unencrypted data is transmitted before the encoded encrypted data and the key are transmitted to the receiver.

In processing block 620, the demodulator system decrypts the encrypted data with a key. As discussed above in conjunction with FIG. 5, the demodulator system may receive the key before, during or after receiving the encrypted data and/or the encoded data.

In a processing block 630, the demodulator system decodes a data file ($\hat{X}^n$) using the encoded unencrypted data and the encoded decrypted data. In one embodiment, the demodulator system decodes the encoded unencrypted data and encoded decrypted data into a list of potential list source codes. The decoding can, for example, be achieved by the improved scheme discussed above in conjunction with FIG. 5. In a decoding process of the scheme, a binary codeword $Y^{nR}$ is mapped to a corresponding syndrome $S^{m_n-k_n}$ to produce an output $r_n(x^{m_n})$ for each $x^{m_n}$ in a coset of $H_n$ corresponding to $S^{m_n-k_n}$. Using the decoding processes, the improved scheme has been shown to achieve a rate list function R(L) bounded by $R(L) \geq H(X) - L \log|X|$ for an i.i.d. source, when $S_n$ is asymptotically optimal for a given source X, i.e. $m_n/n \rightarrow H(X)/\log q$.

In the embodiment discussed above, the demodulator system can extract a data file ($\hat{X}^n$) from the list of potential list source codes. However, it is to be appreciated that alternative methods apparent to those of skill in the art can also be used. In some embodiments, the data file (^$X^n$) is the same as, or substantially similar to, data file ($X^n$) of process 500. In particular, the demodulation system can extract the ($\hat{X}^n$) using the improved scheme.

Specifically, with knowledge of a syndrome of a data file ($X^n$), the data file ($X^n$) can be extracted in several ways. In one embodiment, an approach is to find a k×n matrix D having a full rank such that the rows of D and H form a basis of $F_q^n$. Such k×n matrix can be found, for example, using a Gram-Schmidt process (i.e. method for orthonormalising a set of vectors in an inner product space) with rows of H serving as a starting point. Element $T^{Ln}$ of the Gram-Schmidt process equation shown below is computed where $T^{Ln}$=$DX^n$ and subsequently transmitted to a receiver, which can be the same as or similar to a receiver 242 of demodulator system 202 of FIG. 2B.

$$\begin{pmatrix} H \\ D \end{pmatrix} X^n = \begin{pmatrix} S^{(1-L)n} \\ T^{Ln} \end{pmatrix},$$

The receiver is configured to extract a data file ($\widehat{X^n}$), which according to some embodiments is representative of the data file ($X^n$) from a list of potential list source codes. The above method allows list source codes to be deployed in practice using well known linear code constructions, such as Reed-Solomon or low-density parity-check (LDPC), for example.

Additionally, the method is valid for general linear codes and holds for any pair of full rank matrices H and D with dimensions (n−k)×n and k×n, respectively, such that rank $([H^T D^T]^T)$=n. In particular, the method makes use of known linear code constructions to design secrecy schemes.

Information-Theoretic Metric

An exemplary information-theoretic metric (ϵ-symbol secrecy ($\mu_\epsilon$)) for characterizing and optimizing the system and associated methods disclosed above is also herein provided. In particular, ϵ-symbol secrecy ($\mu_\epsilon$) characterizes the amount of information leaked about specific symbols of a data file ($X^n$) given an encoded version of the data file ($X^n$). Such is especially applicable to secrecy schemes that do not provide absolute symbol secrecy ($\mu_0$), such as the improved scheme and the two-phase secure communication scheme discussed above.

Generally, the metrics ϵ-symbol secrecy ($\mu_\epsilon$) and absolute symbol secrecy ($\mu_0$) can be used in conjunction with process 500 and process 600 for achieving a desired level of secrecy. Absolute symbol secrecy ($\mu_0$) and ϵ-symbol secrecy ($\mu_\epsilon$) can be defined as follows:

Absolute symbol secrecy ($\mu_0$) of a code $C_n$ is represented by:

$$\mu_0(\mathcal{C}_n) = \max\left\{\frac{t}{n} : I(X^{(\mathcal{J})}; Y^{nR_n}) = 0, \forall \mathcal{J} \in \mathcal{J}_n(t)\right\}.$$

Absolute symbol secrecy ($\mu_0$) of a sequence of codes $C_n$ is represented by:

$\mu_0 = \liminf_{n\to\infty} \mu_0(\mathcal{C}_n)$.

In contrast, ϵ-symbol secrecy ($\mu_\epsilon$) of a code $C_n$ is represented by:

$$\mu_\epsilon(\mathcal{C}_n) = \max\left\{\frac{t}{n} : \frac{1}{t} I(X^{(\mathcal{J})}; Y^{nR_n}) \le \epsilon \forall \mathcal{J} \in \mathcal{J}_n(t)\right\}.$$

Additionally, ϵ-symbol secrecy ($\mu_\epsilon$) of a sequence of codes $C_n$ is represented by:

$$\mu_\epsilon = \liminf_{n\to\infty} \mu_\epsilon(\mathcal{C}_n)$$

where ϵ<H(X).

Given a data file $X^n$ and its corresponding encryption Y, ϵ-symbol secrecy ($\mu_\epsilon$) can be computed as a largest fraction t/n such that at most ϵ bits can be inferred from any t-symbol subsequence of data file $X^n$.

$C_n$ can be either a code or a sequence of codes (i.e. list source code) for a discrete memory-less source X with a probability distribution p(x) that achieves a rate list pair (R, L). Additionally, $Y^{nRn}$ is a corresponding codeword for a list-source encoded data file $f_n(X^n)$ created by $C_n$. Furthermore, $I_n(t)$ is a set of all subsets of {(1, . . . , n] of size t, i.e., J∈$I_n$(t)⇔J⊆{1, . . . , n} and |J|=t. Additionally, $X^{(J)}$ is a set of symbols of data file $X^n$ indexed by elements in set J⊆{1, . . . , n}.

It is assumed that a passive, but computationally unbounded, eavesdropper only has access to the list-source encoded message $f_n(X^n)=Y^{nRn}$. It is also assumed that based on an observation of $Y^{nRn}$ the eavesdropper will attempt to determine what is in data file $X^n$. In addition, it is assumed that source statistics and list source code used are universally known, i.e., eavesdropper A has access to a distribution $px_n(X^n)$ of symbol sequences produced by a source and $C_n$.

An amount of information an eavesdropper can gain about particular sequence of source symbols ($X^{(J)}$; $Y^{nRn}$) by observing a list-source encoded message ($Y^{nR_n}$) can be computed or mechanical information I have list on previous page. In particular, for ϵ=0, a meaningful bound on what is a largest fraction of input symbols that is perfectly hidden can be computed.

For example, a list source code $C_n$ capable of achieving a rate-list pair (R, L) comprises an ϵ-symbol secrecy ($\mu_\epsilon$), of $$0 \le \mu_\epsilon \le \min\left\{L\log\frac{|X|}{H(X)-\epsilon}, 1\right\}.$$

In particular, with $$\begin{aligned} &\mu_\epsilon(C_n) = \mu_{\epsilon,n} \\ &I(X^{(\mathcal{J})}; Y^{nR_n}) = H(X^{(\mathcal{J})}) - H(X^{(\mathcal{J})} \mid Y^{nR_n}) \\ &\qquad = n\mu_{\epsilon,n}H(X) - H(X^{(\mathcal{J})} \mid Y^{nR_n}) \le \\ &\qquad n\mu_{\epsilon,n}\epsilon \end{aligned}.$$

Therefore, $$\mu_{\epsilon,n}(H(X)-\epsilon) \le \frac{1}{n}H(X^{(\mathcal{J})} \mid Y^{nR_n}) \le L_n\log|x|.$$

an ϵ-symbol secrecy ($\mu_\epsilon$) of $$0 \le \mu_\epsilon \le \min\left\{L\log\frac{|X|}{H(X)-\epsilon}, 1\right\}$$

is achieved by taking n→∞.

An upper-bound for a maximum average amount of information that an eavesdropper can gain from a message encoded with a list source code $C_n$ with symbol secrecy $\mu_{\epsilon,n}$ can also be computed. In particular, for a list source code $C_n$ discrete memory-less source X, and any ϵ such that 0≤ϵ≤H (X), $$\frac{1}{n}I(X^n; Y^{nR_n}) \le H(X) - \mu_{\epsilon,n}(H(X)-\epsilon),$$

where $\mu_{\epsilon,n}=\mu_\epsilon(C_n)$.

Alternatively, if $\mu_{\epsilon,n}$=t/n, J∈$I_n$(t) and J'={1, . . . , n}\J, then $$\frac{1}{n}I(X^n; Y^{nR_n}) \leq \frac{t}{n}\left(\epsilon + \frac{1}{t}I(X^{(\mathcal{J})}; Y^{nR_n} \mid X^{(\mathcal{J})})\right) \leq \mu_{\epsilon,n}\epsilon + \frac{(n-t)}{n}H(X) = H(X) - \mu_{\epsilon,n}(H(X) - \epsilon).$$

A rate-list function (R, L) with ϵ-symbol secrecy ($\mu_\epsilon$) can be related to the upper bound if list source code $C_n$ achieves a point (R', L) with $$\mu_\epsilon = L\log\frac{|X|}{H(X) - \epsilon}$$

for some ϵ, where $$R^i = \lim_{n\to\infty}\frac{1}{n}H(Y^{nR_n})R' = \lim n\frac{1}{n}H(Y^{nR_n})$$

and R'=R(L).
With δ>0 and n sufficiently large, $$\frac{1}{n}H(Y^{nR_n}) = \frac{1}{n}I(X^n; Y^{nR_n}) \geq H(X) - \mu_\epsilon(H(X) - \epsilon) + \delta = H(X) - L\log|x| + \delta.$$

As a result, R'≤H(X)−L log|X|. In general, the value of n may be chosen according to the delta in the above equation and will depend upon the characteristics of the source. In practice, the length of the code will be determined by security and efficiency constraints.

In some embodiments, uniformly distributed data files ($X^n$) using MDS codes have been shown to achieve ϵsymbol secrecy ($\mu_\epsilon$) bounds. In other embodiments, absolute symbol secrecy ($\mu_0$) can be achieved through use of the improved scheme, as disclosed above, with an MDS parity check matrix H and a uniform i.i.d. source X in $F_q$. With the source X being uniform and i.i.d., no source coding is necessary.

In particular, if H is a parity check matrix of an (n, k, d) MDS and a source X is uniform and i.i.d., the improved scheme is capable of achieving an upper bound $\mu_0$=L, where L=k/n. For example, if (1) H is a parity check matrix of a (n, k, n−k+1) MDS code C over $F_q$, (2) x∈C, and (3) a set J∈$I_n$(k) of k positions of x (denoted by $x^{(\mathcal{J})}$) are fixed, for any other codeword in z∈C we have $z^{(\mathcal{J})}$ $x^{(\mathcal{J})}$ since the minimum distance of C is n−k+1. Additionally, since $C^{(\mathcal{J})}${$x^{(\mathcal{J})}$∈$F^k_q$: x∈C), |$C^{(\mathcal{J})}$|=|C|=$q^k$. Accordingly, $C^{(\mathcal{J})}$ contains all possible combinations of k symbols. Since the aforementioned holds for any coset of H, an upper bound of $\mu_0$=L is achieved where L=k/n.

List Source Codes for General Source Models

Information-theoretic approaches to secure cryptosystems, particularly secrecy, traditionally make one fundamental assumption, namely that a data file ($X^n$) (i.e., plaintext source), a key, and noise of a physical channel (e.g., communication channel) over which an encoded and/or encrypted form of the data file ($X^n$) and the key are transmitted, are substantially uniformly distributed. Here, uniformity is used to indicate that the file, key, or physical channel has equal or close to equal likelihood of all possible different outcomes. The uniformity assumption implies that, before the message is sent, the attacker has no reason to believe that any possible message, key, or channel noise is more likely than any other possible message, key, or channel noise. In practice, the data file ($X^n$), the key, and the noise of the physical channel are not always substantially uniformly distributed, specifically in secure cryptosystems. For example, user passwords are rarely chosen perfectly at random. Additionally, packets produced by layered-protocols are not uniformly distributed, i.e., they usually do not contain headers that follow a pre-defined structure. In failing to take into account non-uniform distributions (hereinafter, "non-uniformity"), security of a supposedly secure cryptosystem can be significantly decreased.

Non-uniformity, in general, poses several threats. In particular, non-uniformity (1) significantly decreases an effective key length of any security scheme, and (2) makes a secure cryptosystem vulnerable to correlation attacks. The foregoing is most severe, for example, when multiple, distributed correlated sources are being encrypted since one source might reveal information about the other. As a result, in order to guarantee security in distributed data collection and transmission, non-uniformity should be accounted for in secure cryptosystems.

The secrecy scheme systems and associated methods for enabling secure communications described above assume uniformization, with the uniformization being performed as part of compression (i.e., encoding and/or encrypting) of a data file ($X^n$), and are therefore most suitable for i.i.d. sources. The compression, for example, does not lead to sufficient guarantees in the way of uniformization. Even slight deviations from uniformization can have considerable effects. As a result, for more general sources (i.e., non-i.i.d. source models), slightly different secrecy scheme systems and associated methods should be used. In particular, using the above-described systems and associated methods with non-i.i.d. sources (e.g., a first order Markov sequence where probability distribution for an nth random variable is a function of a previous random variable in the sequence) can result in a more convoluted analysis since multiple list source encoded messages (i.e., encoded messages resulting from non-i.i.d. source models) can reveal information about each other. If the encoding and encryption process 500 of FIG. 5 were to be applied over multiple blocks of source symbols (i.e., data file(s) ($X^n$)) in a non-i.i.d. source, for example, and the encoded and encrypted multiple blocks of source symbols are decoded and decrypted according to process 600 of FIG. 6, for example, the list of potential list source codes from extracted data file(s) ($\widehat{X^n}$), which according to some embodiments is representative of the data file(s) ($X^n$) from a list of potential list source codes, will not necessarily grow if the multiple blocks of source symbols are correlated.

For example, given an output X=$X_1$, . . . , $X_n$ of n correlated source symbols (i.e., data file(s) ($X^n$)), and using the improved scheme described above, an eavesdropper can observe a coset valued sequence of random elements {H(sn (X))}, with H being a parity check matrix. Since X is a correlated source of symbols, there is no reason to expect that a coset valued sequence will not be correlated. For example, if X forms a Markov chain, the coset valued sequence will be function of the Markov chain. Although the coset valued sequence will not, in general, form a Markov chain itself, the coset valued sequence will still comprise correlations. These correlations can reduce size of a list of potential list source codes (e.g., from an extracted data file(s) ($\widehat{X^n}$)) that an eavesdropper must search through in determining a representative data file(s) ($X^n$) and, consequently, decrease the effectiveness of the improved scheme. Reducing or eliminating these correlations, for example, can counteract the decrease in effectiveness of the improved scheme.

One method for reducing correlations is to use large block lengths of source symbols as an input to the list-source code. This requires an increase of the length of the message used for encryption. For example, if $X_1, X_2, \ldots, X_N$ are N blocks of source symbols produced by a Markov source (i.e., a stationary Markov chain M, together with a function $f$: $S \rightarrow \Gamma$ that maps states S in the Markov chain to letters in a fine alphabet $\Gamma$) such that $X_i \in$ data file $(X^n)$ and $p(X_1, \ldots, X_N) = p(X_1)p(X_2|X_1) \ldots p(X_N|X_{N-1})$, instead of encoding each block individually, a transmitter, which can be the same as or similar to transmitter 230 of FIG. 2A, can compute a plurality of binary codewords $Y^{nNR}$, where $Y^{nNR} = f(X_1, \ldots, X_N)$. This approach (hereinafter, "non-i.i.d. source model approach") has a disadvantage of requiring long block lengths and a potentially high implementation complexity. However, the non-i.i.d. source model approach does not necessarily have to be performed independently over multiple blocks of source symbols (i.e., processing can be performed in parallel. An alternative non-i.i.d. source model approach for reducing coset valued sequence correlations of source symbols, particularly when individual sequences $X_i$ are already substantially large, is to define $Y_1 = f(X_1, X_2)$, $Y_2 = f(X_2, X_3)$, . . . , and so forth. Thus, in one approach, a security scheme may be used on a single message at a time, so that encryption and encoding can be done in a single step. In another approach, the scheme may be used on a combination of multiple messages that are encrypted together, so that both encoding and encryption are done simultaneously.

In another approach, when probabilistic encryption is required over multiple blocks of source symbols, source encoded symbols (e.g., of the improved scheme) can be combined with an output of a pseudorandom number generator (PRG) before being multiplied by parity check matrix H to provide necessary randomization of an output. In another approach, an initial seed of the PRG can be transmitted to a receiver, which can be the same as or similar to a receiver 240 of FIG. 2B, in phase II of the two-phase communication scheme.

It is to be appreciated that although the secrecy scheme systems and associated methods for enabling secure communications described in conjunction with FIGS. 1-6 are stated at being most suitable for i.i.d. source models, for example, the secrecy scheme systems and associated methods can be applied to non-i.i.d. source models.

In at least one embodiment, techniques and features described herein may be used to allow a large portion of a file (e.g., a list coded unencrypted portion) to be securely distributed and cached in a network. The large file portion will not be able to be decoded/decrypted until both the encrypted portion of the file and the key are received. In this manner, much of the content of the file can be distributed (e.g., pre-caching of content) before the keys are distributed, which can be advantageous in many different scenarios.

Figure 7:
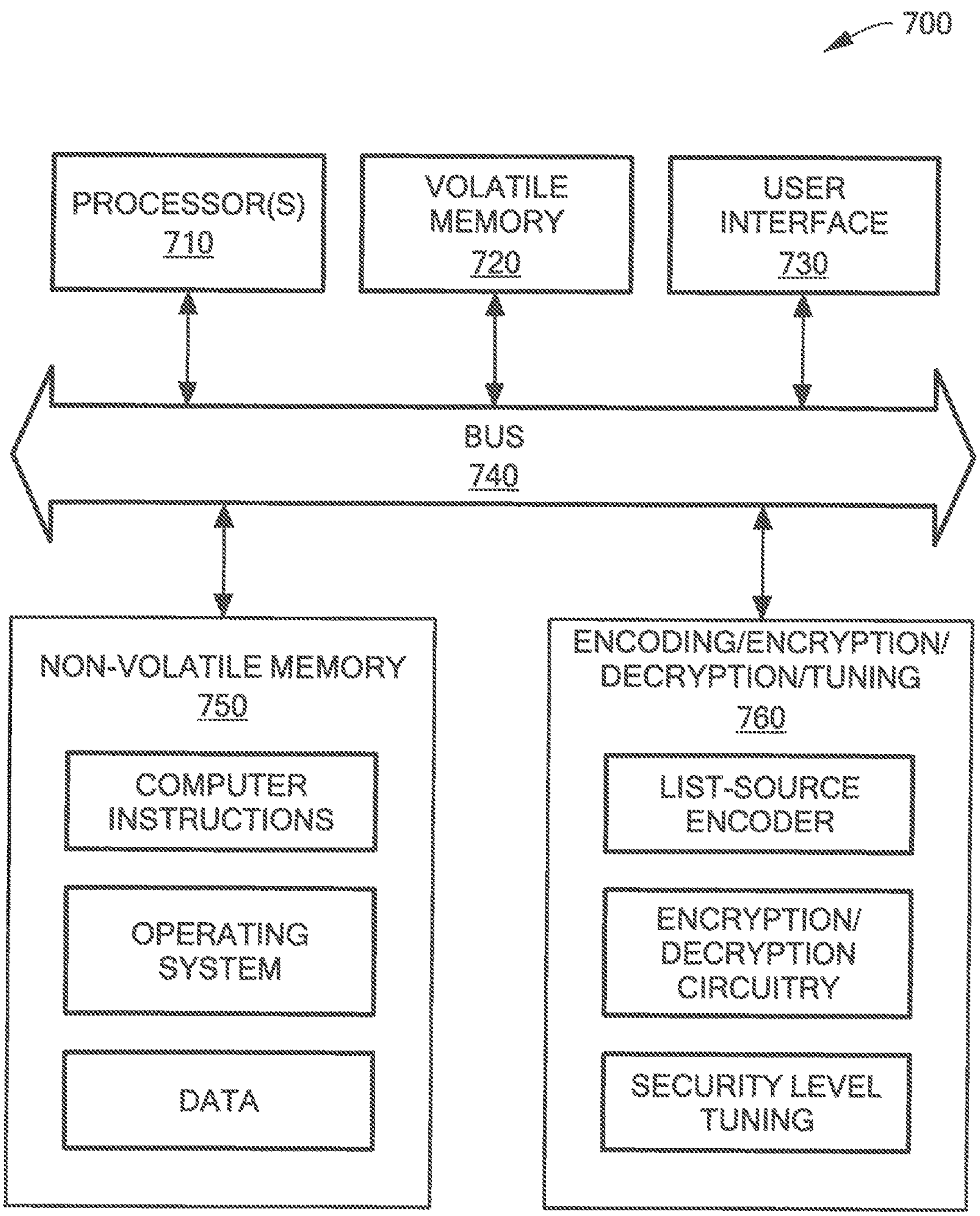
FIG. 7 is a block diagram of an example node architecture that may be used to implement features of the present disclosure.

Referring to FIG. 7, shown is a block diagram of an example processing system 700 that may be used to implement the exemplary systems and associated methods discussed above in conjunction with FIGS. 1-6. In one embodiment, the processing system 700 may be implemented in a mobile communications device, for example, but it is not so limited.

The processing system 700 may, for example, comprise processor(s) 710, a volatile memory 720, a user interface (UI) 730 (e.g., a mouse, a keyboard, a display, touch screen and so forth), a non-volatile memory block 750, and an encoding/encryption/decryption/tuning block 760 (collectively, "components") coupled to a BUS 740 (e.g., a set of cables, printed circuits, non-physical connection and so forth). The BUS 740 can be shared by the components for enabling communication amongst the components.

The non-volatile memory block 750 may, for example, store computer instructions, an operating system and data. In one embodiment, the computer instructions are executed by the processor(s) 710 out of volatile memory 720 to perform all or part of the processes described herein (e.g., processes 500 and 600). The encoding/encryption/decryption/tuning block 760 may, for example, comprise a list-source encoder, encryption/decryption circuitry, and security level tuning for performing the systems, associated methods, and processes described above in conjunction with FIGS. 1-6.

It is to be appreciated that the various illustrative blocks, modules, processing logic, and circuits described in connection with processing system 700 may be implemented or performed with a general purpose processor, a content addressable memory, a digital signal processor, an application specific integrated circuit (ASIC), a field programmable gate array (FPGA), any suitable programmable logic device, discrete gate or transistor logic, discrete hardware components, or any combination thereof, designed to perform the functions described herein.

The techniques described herein are not limited to the specific embodiments described. Elements of different embodiments described herein may be combined to form other embodiments not specifically set forth above. Other embodiments not specifically described herein are also within the scope of the claims.

For example, it is to be appreciated that the processes described herein (e.g., processes 500 and 600) are not limited to use with the hardware and software of FIG. 7. In particular, the processes may find applicability in any computing or processing environment and with any type of machine or set of machines that is capable of running a computer program. In some embodiments, the processes described herein may be implemented in hardware, software, or a combination of the two. In other embodiments, the processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

It is also to be appreciated that the processes described herein are not limited to the specific examples described. For example, the processes described herein (e.g., processes 500 and 600) are not limited to the specific processing order of FIGS. 5 and 6. Rather, any of the processing blocks of FIGS. 5 and 6 may be re-ordered, combined or removed, performed in parallel or in serial, as necessary, to achieve the results set forth above.

Processing blocks in FIGS. 5 and 6, for example, may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described preferred embodiments, which serve to illustrate various concepts, structures and techniques that are the subject of this disclosure, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method of secure communication, the method implemented within a transmitting device having one or more circuits at a first location, the method comprising:

encoding an input data file at the first location using a list source code to generate an encoded data file, wherein using the list source code includes selecting a size of a list of the list source code to tune a desired level of secrecy;

encrypting a select portion of the encoded data file using a key to generate an encrypted data file, wherein the size of the select portion of the encoded data file to be encrypted is used to tune to the desired level of secrecy such that the encoded data file cannot be decoded at the destination location until the encrypted data file has been received and decrypted by a receiving device possessing the key.

2. The method of claim 1, wherein encrypting a select portion of the encoded data file can occur either before, during, or after transmission of the encoded data file.

3. The method of claim 1, further comprising: transmitting the key to the destination location either before, during, or after transmission of the encoded data file to the destination location.

4. The method of claim 1, wherein if the key is compromised during the transmission of the encoded data file, only the transmission of the encrypted data file needs to be aborted.

5. The method of claim 4, wherein security of the method is not compromised if the transmission of the encoded data file is not aborted.

6. The method of claim 1, wherein encoding the input data file using a list source code includes encoding the input data file with a linear code that spreads uncertainty over all symbols of the input data file such that an eavesdropper cannot infer any information concerning any sets of k symbols of the input data file.

7. The method of claim 6, wherein encoding the input data file with a linear code comprises encoding the input data file using a code for which any linear combination of codewords is also a codeword.

8. The method of claim 6, wherein encoding the input data file with a linear code comprises encoding the input data file using Reed Solomon or low-density parity-check (LDPC).

9. The method of claim 1, wherein the list source code is a code that compresses a source sequence below its entropy rate.

10. The method of claim 1, wherein the method is applied as an additional layer of security to an underlying encryption scheme.

11. The method of claim 1, wherein the method is tunable to a desired level of secrecy, wherein size of the key is dependent upon the desired level of secrecy.

12. The method of claim 1, wherein the destination location is a remote location.

13. The method of claim 1, wherein the destination location is the same as the first location.

14. The method of claim 1, wherein a portion of the encoded data file is transmitted before the encrypted data file and the key are transmitted to the receiving device.

15. The method of claim 1, wherein the method is used to perform content pre-caching in a network, wherein the encoded data file is distributed and cached within the network and cannot be decoded/decrypted until both the encrypted portion of the encoded data file and the key are received.

16. A transmitting system for secure communications comprising:

an encoder operable to encode an input data file at a first location using a list source code to generate an encoded data file, wherein using the list source code includes selecting a size of a list of the list source code to tune a desired level of secrecy;

an encryption circuit operable to encrypt a select portion of the encoded data file using a key to generate an encrypted data file, wherein the size of the select portion of the encoded data file to be encrypted is used to tune to the desired level of secrecy such that the encoded data file cannot be decoded at a destination location until the encrypted data file has been received and decrypted by an end user receiving system possessing the key.

17. The transmitting system of claim 16, wherein:

the encoded data file is an unencrypted encoded data file; and encoding the input data file using a list source code includes encoding the input data file with a linear code that spreads uncertainty over all symbols of the input data file such that an eavesdropper cannot infer any information concerning any sets of k symbols of the input data file.

18. The transmitting system of claim 16, wherein the encrypted data file is an encoded encrypted data file.

19. A receiving system comprising:

a receiver operable to receive, at a destination location, one or more of an encoded data file, an encrypted data file, or a key from a first location;

a decryption circuit coupled to the receiver and operable to decrypt the encrypted data file using a key to generate a decrypted data file, wherein the size of the decrypted data file is used to tune to a desired level of secrecy;

a decoder circuit coupled to one or more of the decryption circuit and the receiver and operable to decode one or more of the encoded data file and the decrypted data file using a list source code to generate an output data file, wherein a size of a list of the list source code is used to tune the desired level of secrecy.

20. The receiving system of claim 19, wherein:

the encoded data file is an unencrypted encoded data file; and the list source code spreads uncertainty over all symbols of the encoded and encrypted data files such that an eavesdropper cannot infer any information concerning any sets of k symbols of the encoded and encrypted data file.

21. The receiving system of claim 19, wherein the encrypted data file is an encoded encrypted data file.

22. The receiving system of claim 19, wherein the output data file comprises a list of potential data files.

23. The receiving system of claim 22, wherein the decoder circuit is further operable to determine an input data file from the list of potential data files, wherein the input data file is representative of the encoded data file in combination with the encrypted data file.

* * * * *